(12) United States Patent
Uchida et al.

(10) Patent No.: US 9,034,997 B2
(45) Date of Patent: May 19, 2015

(54) FLUORINE AND EPOXY GROUP-CONTAINING COPOLYMER, AND METHOD FOR PRODUCING SAME

(75) Inventors: Hiroshi Uchida, Minato-ku (JP); Masanao Hara, Minato-ku (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 13/642,202

(22) PCT Filed: May 19, 2011

(86) PCT No.: PCT/JP2011/061549
§ 371 (c)(1),
(2), (4) Date: Oct. 19, 2012

(87) PCT Pub. No.: WO2011/148857
PCT Pub. Date: Dec. 1, 2011

(65) Prior Publication Data
US 2013/0035461 A1 Feb. 7, 2013

(30) Foreign Application Priority Data
May 27, 2010 (JP) ................................ 2010-121516

(51) Int. Cl.
| | |
|---|---|
| C08F 220/32 | (2006.01) |
| C08F 214/18 | (2006.01) |
| C08G 59/32 | (2006.01) |
| C08G 59/42 | (2006.01) |
| C08G 59/68 | (2006.01) |

(Continued)

(52) U.S. Cl.
CPC ............. *C08F 214/18* (2013.01); *C08F 220/32* (2013.01); *C08G 59/3254* (2013.01);

(Continued)

(58) Field of Classification Search
USPC .................................................... 526/89, 253
See application file for complete search history.

(56) References Cited

U.S. PATENT DOCUMENTS

| | | | |
|---|---|---|---|
| 2005/0267265 A1* | 12/2005 | Shimomura et al. | 525/526 |
| 2009/0030217 A1 | 1/2009 | Uchida et al. | |
| 2011/0144279 A1* | 6/2011 | Uchida et al. | 525/301 |

FOREIGN PATENT DOCUMENTS

| | | |
|---|---|---|
| JP | 1-216948 A | 8/1989 |
| JP | 4-202485 A | 7/1992 |

(Continued)

OTHER PUBLICATIONS

Extended European Search Report for Application No. 11786556.8 dated Oct. 31, 2013, 5 pages.

*Primary Examiner* — Peter D Mulcahy
*Assistant Examiner* — Henry Hu
(74) *Attorney, Agent, or Firm* — Sughrue Mion, PLLC

(57) ABSTRACT

Provided is a fluorine- and epoxy group-containing copolymer with excellent workability at room temperature, high water-repellency, and excellent characteristics as a water vapor barrier. Also provided is an efficient method for producing said copolymer. The fluorine and epoxy group-containing copolymer is characterized by containing at least a monomer unit represented by general formula (1): {Therein, $R^1$-$R^{10}$ each independently represent an alkyl group having 1-3 carbon atoms or a hydrogen atom, $R^{11}$ is a hydrogen atom, methyl group, or phenyl group, and $R^5$ or $R^6$ can be linked with $R^7$ or $R^8$ to form a ring.} and a monomer unit represented by general formula (2): {Therein, $R^{12}$ and $R^{13}$ each independently represent a hydrogen atom or a fluorine atom; $R^{14}$ represents a hydrogen atom, fluorine atom, methyl group or trifluoromethyl group, and $R^{15}$ represents a flourine atom or perfluoro group having at most 12 carbon atoms}.

12 Claims, 28 Drawing Sheets

(51) Int. Cl.
   *C08L 63/00* (2006.01)
   *C08F 218/12* (2006.01)
   *C08F 224/00* (2006.01)
   *C08F 220/14* (2006.01)

(52) U.S. Cl.
   CPC .......... *C08G59/4215* (2013.01); *C08G 59/688* (2013.01); *C08L 63/00* (2013.01); *C08F 218/12* (2013.01); *C08F 220/14* (2013.01); *C08F 224/00* (2013.01)

(56) References Cited

FOREIGN PATENT DOCUMENTS

| | | | |
|---|---|---|---|
| JP | 04-202485 A | * | 7/1992 |
| JP | 5-39326 A | | 2/1993 |
| JP | 5-163457 A | | 6/1993 |
| JP | 07-268034 | * | 10/1995 |
| JP | 7-268034 A | | 10/1995 |
| JP | 8-73534 A | | 3/1996 |
| JP | 11-189622 A | | 7/1999 |
| JP | 2001-89623 A | | 4/2001 |
| JP | 2001-253928 A | | 9/2001 |
| JP | 2003-155313 A | | 5/2003 |
| JP | 2003-277478 A | | 10/2003 |
| JP | 2003-313328 A | | 11/2003 |
| WO | 2006/123814 A2 | | 11/2006 |
| WO | WO-2006/123814 A2 | * | 11/2006 |
| WO | 2010/016585 A1 | | 2/2010 |
| WO | WO-2010/016585 A | * | 2/2010 |
| WO | WO-2010/016585 A1 | * | 2/2010 |

* cited by examiner

FLUORINE AND EPOXY GROUP-CONTAINING COPOLYMER, AND METHOD FOR PRODUCING SAME

CROSS REFERENCE TO RELATED APPLICATIONS

This application is a National Stage of International Application No. PCT/JP2011/061549 filed May 19, 2011, the contents of which are incorporated herein by reference in their entirety.

TECHNICAL FIELD

The present invention relates to a fluorine and epoxy group-containing copolymer and a method for producing the same. More specifically, the present invention relates to a fluorine and epoxy group-containing copolymer that can provide a cured product having good water repellency and water vapor barrier property, and that has excellent storage stability and is suitable for, for example, coating materials, ink, adhesives, electronic materials (solder resist, interlayer insulating film, etc.), and molded products, and a method for producing the same.

BACKGROUND ART

Conventionally, fluorine-containing polymers have been used in a variety of applications, such as electric parts, insulating parts, coating materials, ink and molded products, due to their excellent electric insulation, low dielectric constant, abrasion resistance, acid resistance, weather resistance, optical properties, etc. As common fluorine-containing polymers, tetrafluoroethylene/ethylene copolymer, tetrafluoroethylene/hexafluoropropylene copolymer, etc., can be mentioned, but many of these polymers are crystalline polymers, and thus, in processing, the polymers must be heat melted at high temperature and high pressure for molding. Thus, it was difficult in applying the polymers to members requiring a thin-film coating or members containing microstructures, such as light emitting diode (LED) devices and semiconductor devices.

Accordingly, strenuous efforts are underway to develop polymers of which monomer unit contains a reactive functional group and which provide a cured product when a curing agent is added.

For example, following Patent Document 1 discloses a method for introducing an epoxy group into a polyether terminal by reacting a fluorine-containing polyether having a hydroxy group and epichlorohydrin in the presence of a strong alkali substance, such as sodium hydroxide.

In addition, following Patent Document 2 discloses an epoxy group-containing and fluorine-containing copolymer for coating material obtained by radical copolymerization of a fluorine-containing olefin compound and an epoxy group-containing allylether.

Furthermore, following Patent Document 3 discloses a copolymer comprising an epoxy group-containing polymerizable unsaturated compound and a polyfluoroalkylolefin.

RELATED ART

Patent Documents

Patent Document 1: Kokai (Japanese Unexamined Patent Publication) No. 1-216948
Patent Document 2: Kokai (Japanese Unexamined Patent Publication) No. 7-268034
Patent Document 3: Kokai (Japanese Unexamined Patent Publication) No. 11-189622

SUMMARY OF INVENTION

Problems to be Solved by the Invention

In the reaction disclosed in Patent Document 1, both ring opening and ring closing can occur thereby leaving primary and secondary alcohols as byproducts, and thus the quantitative introduction of the epoxy group is difficult. Specifically, when a high molecular weight fluorine-containing polyether is used, purification by distillation cannot be carried out and thus contamination of chlorine is unavoidable, thereby impairing electric properties and chemical stability.

The copolymer in Patent Document 2 is solid at room temperature, and thus there is room for improvement on workability, for example, it must be dissolved in a solvent in order to obtain a cured product. In Patent Document 3 an acryloyl group, a methacryloyl group, a vinyl group, etc., are used as polymerizable unsaturated groups. However, a copolymer obtained by polymerization of acryloyl groups has a high molecular weight, and thus is solid in many cases, so that workability may be impaired. In addition, since a vinyl group has a low reactivity in copolymerization, a large amount of a polymerization initiator must be used to enhance the conversion rate, which may give an adverse effect on the properties of a cured product.

None of Patent Documents 1 to 3 describes or suggests that the cured product has a gas (water vapor) barrier property which is important as a sealant for semiconductor devices, light emitting devices, etc.

Considering the above, the problem to be solved by the present invention is to provide a fluorine and epoxy group-containing copolymer having excellent workability at room temperature, high water repellency and high water vapor barrier property, and an efficient method for producing the same.

Means to Solve the Problems

As a result of extensive and intensive research and experiments to solve the above problems, the present inventors have found that the radical copolymerization of an ester compound having both an allyl group and an alicyclic epoxy group epoxidized by hydrogen peroxide oxidation or peracetate oxidation in stead of the halohydrin method, with an olefin compound having a carbon-carbon double bond at a terminal and composed of fluorine atom-introduced hydrocarbon (hereinafter referred to as a terminal-olefin fluorine-containing compound) can result in a fluorine atom-introduced epoxy group-containing polymer, and that a cured product thereof has excellent water repellency and water vapor barrier property, and thereby have achieved the present invention.

Thus, the present invention is as described below:

[1] A fluorine and epoxy group-containing copolymer comprising at least a monomer unit represented by following general formula (1):

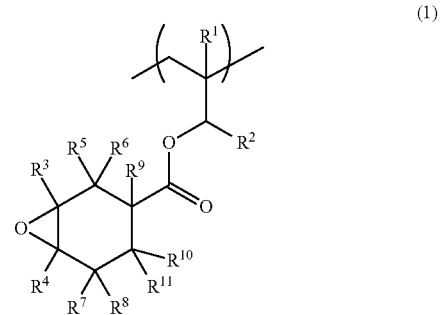

[wherein
$R^1$-$R^{10}$ each independently represent a hydrogen atom or an alkyl group having 1-3 carbon atoms, $R^{11}$ represents a hydrogen atom, a methyl group, or a phenyl group, and $R^5$ or $R^6$ can be linked to $R^7$ or $R^8$ to form a ring], and a monomer unit represented by following general formula (2):

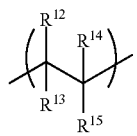
(2)

[wherein $R^{12}$ and $R^{13}$ each independently represent a hydrogen atom or a fluorine atom, $R^{14}$ represents a hydrogen atom, a fluorine atom, a methyl group or a trifluoromethyl group, and $R^{15}$ represents a fluorine atom or a perfluoroalkyl group having not greater than 12 carbon atoms].

[2] The fluorine and epoxy group-containing copolymer according to the above [1] wherein the monomer unit represented by general formula (1) is at least one represented by the following formula:

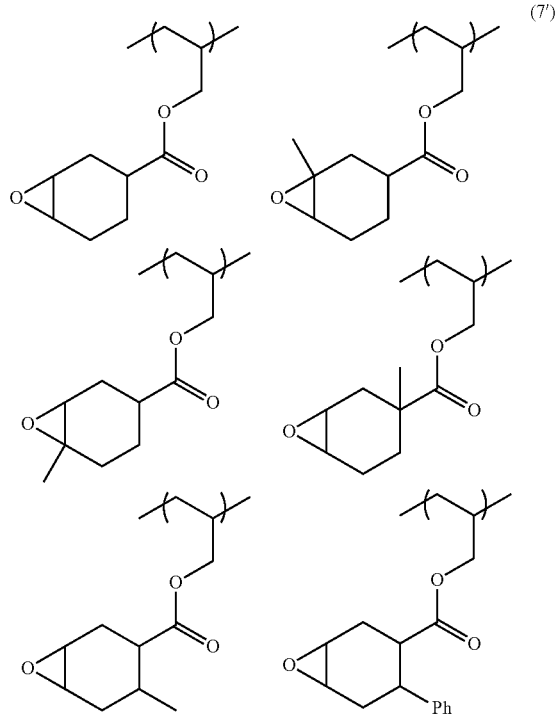
(7')

[3] The fluorine and epoxy group-containing copolymer according to the above [2] wherein the monomer unit represented by general formula (1) is represented by the following formula:

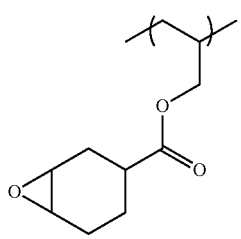

and, in the monomer unit represented by general formula (2), $R^{12}$, $R^{13}$, and $R^{14}$ are a hydrogen atom, and $R^{15}$ is a perfluorohexyl group or a perfluorooctyl group.

[4] The fluorine and epoxy group-containing copolymer according to any one of the above [1] to [3], further comprising a monomer unit represented by following general formula (3):

(3)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

[5] The fluorine and epoxy group-containing copolymer according to any one of the above [1] to [4] wherein the epoxy equivalent of the copolymer is 190 g/eq. to 3000 g/eq.

[6] The fluorine and epoxy group-containing copolymer according to any one of the above [1] to [5] wherein the number average molecular weight of the copolymer is 400-10000.

[7] The fluorine and epoxy group-containing copolymer according to any one of the above [1] to [6] wherein a mole % of each monomer unit in the copolymer is in the following ratio:
the monomer unit represented by general formula (1): 20-95 mole %,
the monomer unit represented by general formula (2): 5-50 mole %, and
the monomer unit represented by general formula (3): 0-50 mole %, and
their sum is 100 mole %.

[8] A method for producing a fluorine and epoxy group-containing copolymer, comprising the step of radical copolymerizing an epoxy group-containing monomer represented by following general formula (4):

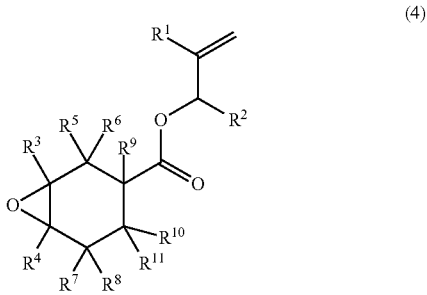
(4)

[wherein $R^1$-$R^{10}$ each independently represent a hydrogen atom or an alkyl group having 1-3 carbon atoms, $R^{11}$ represents a hydrogen atom, a methyl group, or a phenyl group, and $R^5$ or $R^6$ can be linked to $R^7$ or $R^8$ to form a ring], and a fluorine atom-containing monomer represented by following general formula (5):

(5)

[wherein $R^{12}$ and $R^{13}$ each independently represent a hydrogen atom or a fluorine atom, $R^{14}$ is a hydrogen atom, a fluorine atom, a methyl group, or a trifluoromethyl group, and $R^{15}$ is a fluorine atom or a perfluoroalkyl group having not greater than 12 carbon atoms].

[9] The method for producing a fluorine and epoxy group-containing copolymer according to the above [8], comprising the step of further radical copolymerizing an α-olefin monomer represented by following general formula (6):

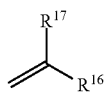

(6)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

[10] The method for producing a fluorine and epoxy group-containing copolymer according to the above [8] or [9], wherein the epoxy group-containing monomer represented by general formula (4) is at least one selected from the group of monomers containing an epoxy group and an allyl group represented by the following formula:

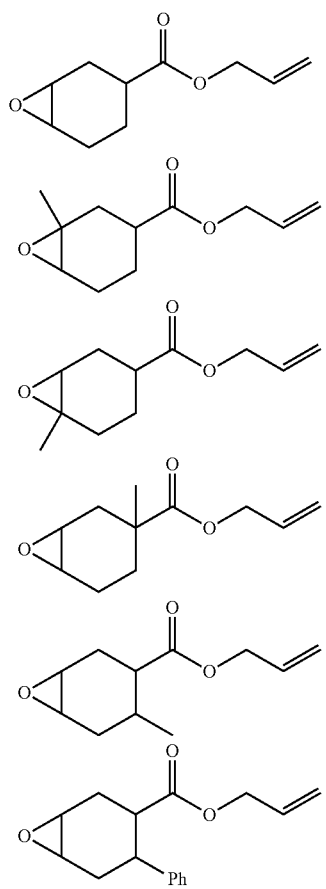

(7)

[11] The method for producing a fluorine and epoxy group-containing copolymer according to any one of the above [8] to [10], wherein the reaction temperature for radical copolymerization is 100° C. to 200° C.

[12] The method for producing a fluorine and epoxy group-containing copolymer according to any one of the above [8] to [11], wherein the radical copolymerization is carried out in the presence of an aliphatic, alicyclic, or aromatic hydrocarbon solvent.

[13] The method for producing a fluorine and epoxy group-containing copolymer according to any one of the above [8] to [12], wherein the epoxy group-containing monomer represented by general formula (4) is 3,4-epoxycyclohexane-1-carboxylic acid allyl ester, and the fluorine atom-containing monomer represented by general formula (5) is at least one of perfluorohexylethylene and perfluorooctylethylene.

[14] The method for producing a fluorine and epoxy group-containing copolymer according to any one of the above [8] to [13], further comprising the step of evaporating low molecular weight components containing unreacted monomers using a thin film evaporator or a molecular distillation still after radical copolymerization.

Effects of the Invention

From the fluorine and epoxy group-containing copolymer of the present invention, a fluorine atom- and an epoxy group-introduced curable resin having excellent water repellency and water vapor barrier property can be obtained. Thus, the fluorine and epoxy group-containing copolymer of the present invention is very promising in the field of surface coating materials and sealants for semiconductor devices and light emitting devices.

MODE FOR CARRYING OUT THE INVENTION

Figure 1:
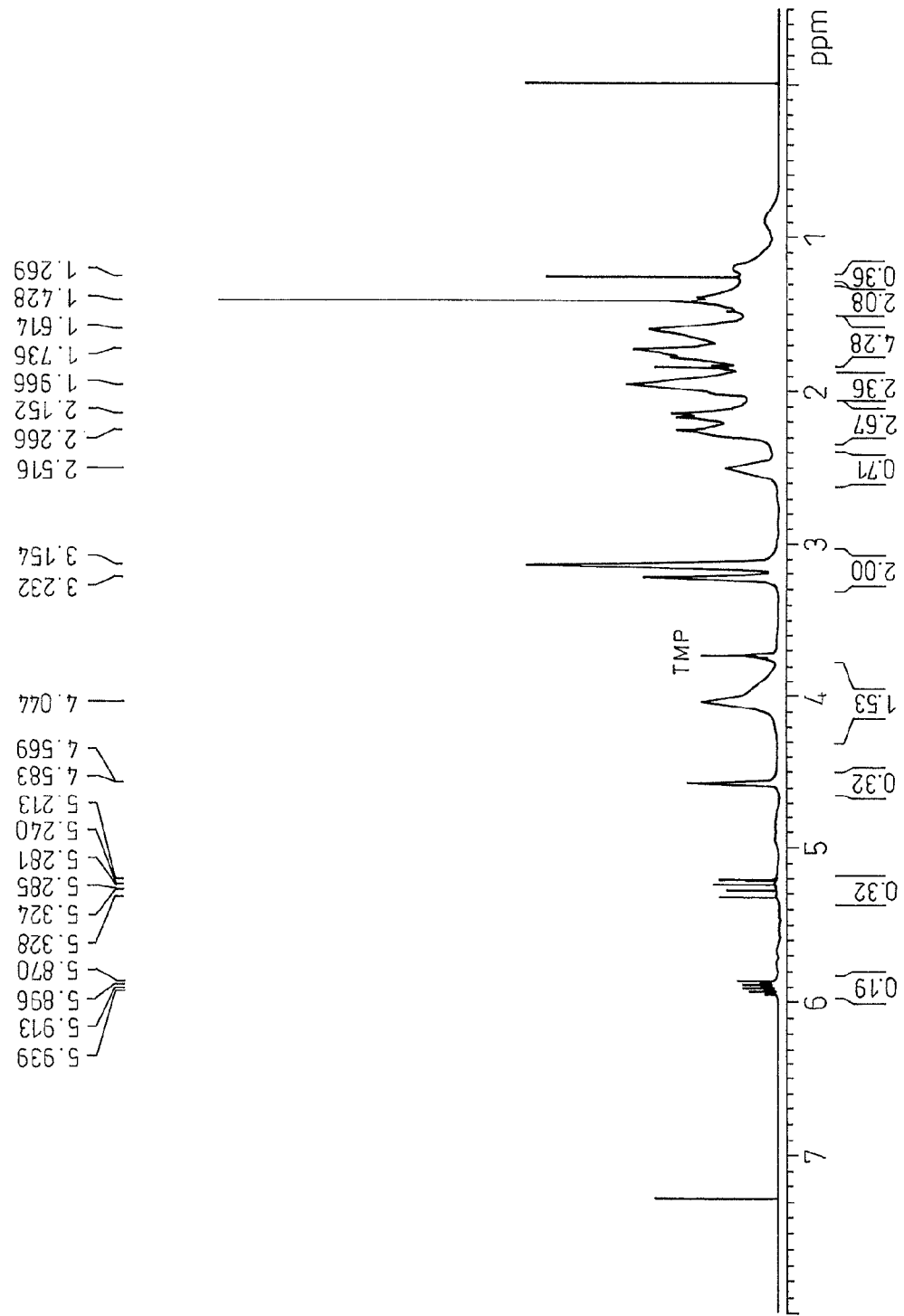
FIG. 1 A chart showing the $^1$H-NMR spectrum of a product obtained in Working Example 1.

The present invention will now be explained in detail below.

The fluorine and epoxy group-containing copolymer of the present invention comprises at least a monomer unit represented by following general formula (1):

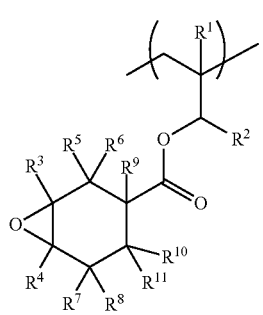
(1)

[wherein $R^1$-$R^{10}$ each independently represent a hydrogen atom or an alkyl group having 1-3 carbon atoms, $R^{11}$ represents a hydrogen atom, a methyl group, or a phenyl group, and $R^5$ or $R^6$ can be linked to $R^7$ or $R^8$ to form a ring], and a monomer unit represented by following general formula (2):

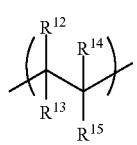
(2)

[wherein $R^{12}$ and $R^{13}$ each independently represent a hydrogen atom or a fluorine atom, $R^{14}$ represents a hydrogen atom, a fluorine atom, a methyl group or a trifluoromethyl group, and $R^{15}$ represents a fluorine atom or a perfluoroalkyl group having not greater than 12 carbon atoms].

Preferred monomer units represented by general formula (1) can include those represented by the following formula:

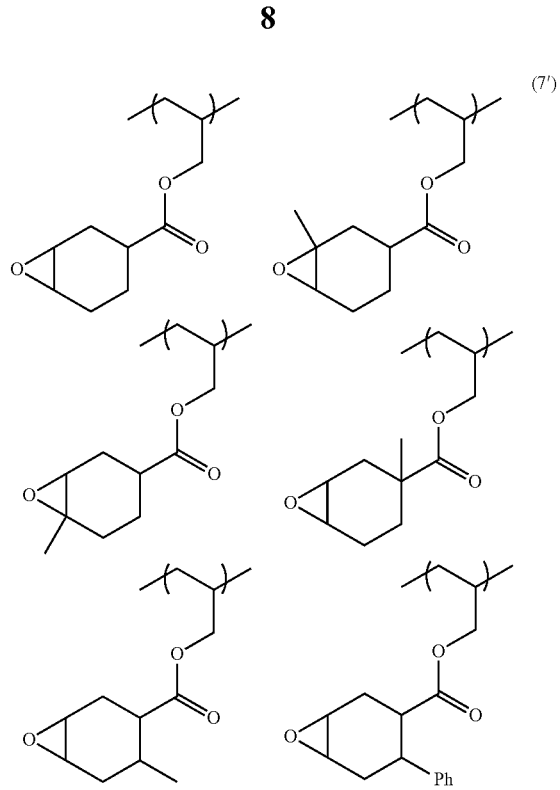
(7')

The fluorine and epoxy group-containing copolymer of the present invention can further comprise, as needed, a monomer unit represented by following general formula (3):

(3)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

As a method for producing the fluorine and epoxy group-containing copolymer of the present invention, a method may preferably be used which comprises radical copolymerizing at least an epoxy group-containing monomer represented by following general formula (4):

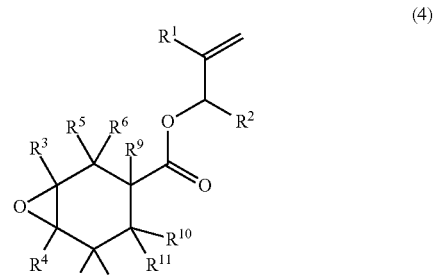
(4)

[wherein $R^1$-$R^{10}$ each independently represent a hydrogen atom or an alkyl group having 1-3 carbon atoms, $R^{11}$ represents a hydrogen atom, a methyl group, or a phenyl group, and $R^5$ or $R^6$ can be linked to $R^7$ or $R^8$ to form a ring (for example, when one carbon atom (methylene group) to which a hydrogen atom and/or a methyl group is bound intervenes between a carbon atom to which $R^5$ and $R^6$ are bound and a carbon atom to which $R^7$ and $R^8$ are bound, a norbornane backbone is formed)] and a fluorine atom-containing monomer represented by following general formula (5):

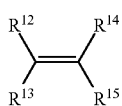

(5)

[wherein $R^{12}$ and $R^{13}$ each independently represent a hydrogen atom or a fluorine atom, $R^{14}$ represents a hydrogen atom, a fluorine atom, a methyl group or a trifluoromethyl group, and $R^{15}$ represents a fluorine atom or a perfluoroalkyl group having not greater than 12 carbon atoms].

Examples of preferred monomers containing an alicyclic epoxy group and an allyl group represented by general formula (4) include monomers represented by following formula (7):

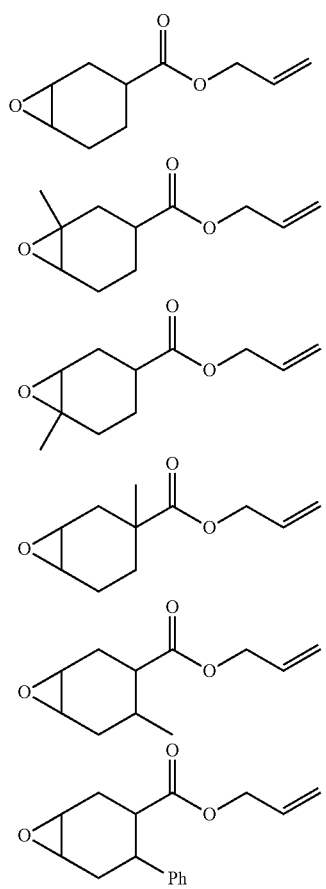

(7)

From the viewpoint of industrial use, a monoepoxy compound that is obtained from allylesterification followed by regioselective epoxydation of a reaction product of butadiene and (meth)acrylic acid as a precursor may be mentioned.

Examples of such compounds include 3,4-epoxycyclohexane-1-carboxylic acid (meth)allylester, 3,4-epoxycyclohexane-1-methyl-1-carboxylic acid (meth)allylester, and 3,4-epoxycyclohexane-6-methyl-1-carboxylic acid (meth)allylester. Among them, most preferred may be at least one of 3,4-epoxycyclohexane-1-carboxylic acid allylester and 3,4-epoxycyclohexane-1-methyl-1-carboxylic acid allylester. Since these compounds have an alicyclic epoxy group, they have higher storage stability than glycidyl epoxy compounds, and can be easily put into industrial uses. Furthermore, since the alicyclic epoxy group has higher cation polymerizability with a carboxyl group than glycidyl group which is conventionally used, it has a very advantageous characteristics in fields where curing at low temperature and a short period of time is desired. As used herein, the term "alicyclic epoxy group" refers to a structure in which two adjacent carbon atoms forming an intramolecular alicyclic backbone are bound to one oxygen atom to form an oxirane ring.

Examples of preferred terminal-olefin fluorine-containing copolymers represented by general formula (5) include perfluoroalkylene and perfluoroalkylethylene, specifically tetrafluoroethylene, hexafluoropropylene, perfluorohexylethylene, perfluorooctylethylene, etc., with perfluorohexylethylene and perfluorooctylethylene being preferred.

By carrying out the radical reaction of the carbon-carbon double bond of the above epoxy compound and the carbon-carbon double bond of an terminal-olefin compound comprising a fluorine-introduced hydrocarbon, a fluorine-containing epoxy group-containing copolymer having excellent water repellency can be obtained.

Within the scope in which the properties of the copolymer (resin) are not badly affected, another copolymerizable monomer can also be used. As such copolymerizable monomers, α-olefin monomers represented by following general formula (6):

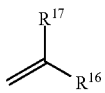

(6)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group] may be more preferred, since they do not impair water repellency or flexibility.

Specific examples of such an α-olefin monomer include ethylene, propylene, isobutene, 1-butene, 3-methylbutene-1, 1-pentene, 4-methylpentene-1,1-hexene, 1-heptene, 1-octene, 1-nonene, 1-decene, 1-dodecene, 1-tetradecene, 1-hexadecene, 1-octadecene, 4-vinylcyclohexene, 5-vinylnorbornene, limonene, allylbenzene, etc. More preferred is at least one of ethylene, 1-octene, 1-decene, 1-dodecene, 1-tetradecene, 1-hexadecene, 1-octadecene, 4-vinylcyclohexene, and limonene, and more preferably, at least one of 1-decene, 1-dodecene, 1-tetradecene, 1-hexadecene and 1-octadecene. When the carbon chain is too long, it may be difficult in most cases to impart a sufficient mechanical strength to the cured copolymer.

Furthermore, as a compound having another copolymerizable carbon-carbon double bond, there can be mentioned an allyl group-containing compound, such as allyl n-hexanoate, allyl cyclohexanoate, allyl cyclohexylpropionate, allyl benzoate, allyl phenylacetate, allyl phenoxyacetate, allyl trifluoroacetate, allyl methyl carbonate, allyl ethyl carbonate, allyl methyl ether, allyl glycidyl ether, allyl benzyl ether, allyloxytrimethylsilane, diallyl adipate, diallyl maleate, diallyl malonate, diallyl itaconate, 1,2-diallyloxyethane, and diallyl phthalate; a vinyl group-containing compound, such as vinyl acetate, vinyl n-hexanoate, vinyl cyclohexanoate, vinyl pivalate, vinyl n-dodecanoate, vinyl benzoate, vinyl 4-t-butylbenzoate, vinyl phenylacetate, N-vinyl phthalimide, vinyl cyclohexyl ether, vinyl trifluoroacetate, vinyltrimethylsilane, vinyltriphenoxysilane, divinyldimethylsilane, divinyloxyethane, divinyl diethyleneglycol diether, and 1,4-divinyloxybutane; an acrylate ester, such as methyl acrylate, ethyl acrylate, isopropyl acrylate, n-butyl acrylate, 2-ethylhexyl acrylate, cyclohexyl acrylate, lauryl acrylate, benzyl acrylate, phenoxyethyl acrylate, glycidyl acrylate, N-methylaminomethyl acrylate, and N,N-dimethylaminoethyl acrylate; a methacrylate ester, such as methyl methacrylate, ethyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, phenoxyethyl methacrylate, glycidyl methacrylate, aminomethyl methacrylate, N-methylaminomethyl methacrylate, N,N-dimethylaminoethyl methacrylate, and 3,4-epoxycyclohexylmethyl methacrylate; acrylonitrile, methacrylonitrile, acrylamide, methacrylamide, a styrene-based compound, such as styrene, vinyltoluene, α-methylstyrene, divinylbenzene, and 4-vinylbiphenyl; a N-substituted maleimide compound, such as N-cyclohexyl maleimide and N-phenyl maleimide, and the like. Since these compounds can be selected as appropriate, they can impart a variety of characteristics to resins having them as a component.

The blending ratio of these monomers in radical copolymerization can be determined as appropriate depending on a hydrophobic group, an aromatic ring, a functional group, etc., desired to be provided to the epoxy resin composition, and the amount used of the epoxy compound can be determined as appropriate depending on the degree of the amount of the epoxy group desired to be provided to the epoxy resin of interest. The blending ratio may preferably be such that, in the copolymer, the sum of the monomer units represented by the above general formula (1) is 20-95 mole %, the sum of the monomer units represented by the above general formula (2) is 5-50 mole %, and the sum of the monomer units represented by the above general formula (3) is 0-50 mole %, and the total sum of these monomer units is not greater than 100 mole %. When the sum of the monomer units represented by general formula (1) is too small, it would be difficult to obtain a cured product having a good mechanical strength. When the sum of the monomer units represented by general formula (2) is too large, compatibility with other components in the resin composition may decrease and a highly-transparent cured product may not be obtained. When the total sum is less than 100 mole %, the remainder is derived from other polymerizable monomers used in combination as needed and the denatured products of monomers, such as epoxy ring-opened products of epoxy group-containing monomers constituting the monomer units represented by the above general formula (1).

The preferred epoxy equivalent of the fluorine and epoxy group-containing copolymer of the present invention can be 190 g/eq. to 3000 g/eq., and more preferably 250 g/eq. to 1000 g/eq. The epoxy equivalent is defined by the molecular weight of the copolymer per epoxy group, i.e., (molecular weight of the copolymer/the number of epoxy groups). When the epoxy equivalent is lower than 190 g/eq., the glass transition temperature of the cured product, i.e., thermal resistance, may be high, but flexibility may be lost. On the other hand, when it exceeds 3000 g/eq., the crosslinking density may decrease thereby reducing thermal resistance, with a result that the content of fluorine atoms increases, and thus compatibility with other compounds decreases, which is not desirable.

When the monomers are liquid at the polymerization temperature, radical copolymerization can be carried out without solvents. When a solvent is used, any solvent that dissolves the monomers and polymers can be used without any limitation, but the solvent may preferably be inert to the epoxy group. For example, aliphatic hydrocarbons, such as hexane, heptane, and octane; alicyclic hydrocarbons, such as cyclopentane, cyclohexane, and cycloheptane; aromatic hydrocarbons, such as benzene, toluene, and xylene; ketones, such as acetone, methylethyl ketone, and methylisobutyl ketone; ethers, such as diethyl ether, dibutyl ether, t-butylmethyl ether, and dioxane; esters, such as ethyl acetate, isobutyl acetate, ethyleneglycol monoacetate, propyleneglycol monoacetate, propyleneglycol monomethylether acetate, and dipropyleneglycol monoacetate; lactones, such as γ-butyrolactone, δ-valerolactone, and ε-caprolactone; ethyleneglycol monoalkyl (1-4 carbon atoms) ethers; diethyleneglycol monoalkyl (1-4 carbon atoms) ethers; ethyleneglycol dialkyl (1-4 carbon atoms) ethers; diethyleneglycol dialkyl (1-4 carbon atoms) ethers, such as diethyleneglycol dimethylether and diethyleneglycol diethylether; ethyleneglycol monoalkyl (1-4 carbon atoms) ether acetates; diethyleneglycol monoalkyl (1-4 carbon atoms) ether acetates; halogenated hydrocarbons, such as carbon tetrachloride and chloroform; alcohols, such as methanol, ethanol, 2-propanol, and cyclohexanol, and the like may be used. Depending on the condition, amides, such as dimethylformamide and dimethylacetamide can be used. These solvents may be used alone or in combination. When a solvent is used, radical copolymerization may preferably be carried out in the presence of an aliphatic, alicyclic or aromatic hydrocarbon solvent.

During radical copolymerization, a conventional radical polymerization initiator can be used as a polymerization initiator. For example, azo-based compounds, such as 2,2'-azobisisobutyronitrile and 2,2'-azobis-(2,4-dimethylvaleronitrile); dialkylperoxy dicarbonates, such as lauroyl peroxide, t-butylperoxy(2-ethylhexanoate), t-butylperoxyisopropyl monocarbonate, diisopropylperoxy dicarbonate, and bis(4-t-butylcyclohexyl)peroxy dicarbonate; dialkyl peroxides, such as 1,1-di(t-hexylperoxy)-3,3,5-trimethylcyclohexane, 1,1-di (t-butylperoxy)cyclohexane, di-t-butyl peroxide, and di-t-hexyl peroxide; peroxides, such as dicumyl peroxide, methylethylketone peroxide, benzoyl peroxide, t-butylperoxy benzoate, and cumene hydroperoxide can used alone or in combination. Among them, dialkyl peroxide and dialkylperoxy dicarbonate may be preferred as the polymerization initiator in that they have a high initiator efficiency and the initiator residue hardly promotes the hydrolysis or acid decomposition of the epoxy group. The polymerization initiator may preferably be blended in the range of 0.1 mole % to 30 mole % relative to the total moles of the monomers.

The reaction temperature can be selected as appropriate from between −10 to 220° C. depending on the type of the polymerization initiator, and may preferably be 100-200° C. because of the stability of the epoxy group and the ease of handling.

With regard to the reaction pressure, when a compound that is gaseous at ordinary temperature, such as tetrafluoroethylene and hexafluoropropylene are reacted, pressure needs to be applied, but when an olefin that is liquid at ordinary temperature is used, the reaction can also be carried out under ordinary pressure.

The molecular weight of a copolymer to be produced depends on the reaction temperature, the method of supplying the monomer or the polymerization initiator, the monomer concentration, the type of the monomer, etc. The molecular weight may preferably be such that the epoxy resin composition after radical polymerization has a number average molecular weight of 400-10,000. When the molecular weight is too large, workability may be impaired. On the other hand, when the molecular weight is too small, the resin after curing can not have sufficient mechanical strength.

Depending on the polymerization condition, a small amount of a diol derivative in which the epoxy group is hydrolyzed, and specifically when a perester is used, a small amount of a glycol monoester derivative formed by the reaction of an initiator-derived organic acid and the epoxy group may be produced as byproducts. Though their contamination may reduce thermal resistance, it can enhance mechanical strength, and thus may not pose a problem if the overall properties are acceptable.

To the epoxy group-containing copolymer thus obtained, a variety of properties required for a coating material, an ink, an adhesive, an electronic material (solder resist, interlayer insulating film, etc.), a molded product, etc., may be imparted by controlling the molecular weight or varying the type of monomers to be introduced.

The above epoxy group-containing copolymer may not only be mixed alone with a curing agent to produce a cured product, but also be mixed with another resin composition. In such a case, the use of the epoxy group-containing copolymer having an epoxy equivalent of 250 g/eq. to 1000 g/eq. and a molecular weight of 500 to 5000 may be particularly preferred in terms of compatibility with other components.

The reaction mixture after radical copolymerization can be used as it is depending on the intended use. For example, when used in screen printing, polymerization may be carried out in a high boiling solvent, such as diethyleneglycol monoethylether acetate and γ-butyrolactone, to which necessary additives, such as silica, talc, a pigment, an antifoaming agent, and a leveling agent, can be added, and after kneading in a dispersing machine, such as a triple roll mill, the product can be used.

When used without solvents, the residual olefin-based monomers are not involved in the following curing reaction of the epoxy group, and thus after evaporation as needed, a curing initiator of the epoxy group can be directly added to the polymerization solution, and after further adding a necessary additive, it can be molded by cast polymerization. In addition, since there are residual epoxy-based monomers after polymerization, it is a very effective means to evaporate residual monomers and low molecular weight oligomers using a thin film evaporator or a molecular distillation still in order to improve shrinking percentage or mechanical strength.

As used herein, the thin film evaporator is an instrument that makes a liquid to be treated a thin film in order to evaporate it at lower temperature under vacuum without influence of heat, and a falling-thin film evaporator, an agitated thin-film evaporator, a centrifugal thin film evaporator, etc., are known. They are generally operated at a pressure of 0.01 kPa to 10 kPa, and a temperature of 50° C. to 250° C.

A molecular distillation still is an instrument in which a liquid film on the evaporation surface is made as thin as possible so that an extremely calm evaporation occurs from the evaporation surface when an extremely high vacuum is maintained. The distance between the evaporation surface and the condensation surface is made not greater than the mean free path of the molecules, and a sufficient temperature difference between the evaporation surface and the condensation surface is maintained so as to prevent the molecules from returning to the condensation surface as much as possible. A pot molecular distillation still, a falling-film molecular distillation still, a centrifugal molecular distillation still, an experimental centrifugal molecular distillation still, etc., are known. It is operated at a pressure of not greater than 0.01 kPa, usually 0.1-1 kPa, and a temperature of 50° C. to 250° C., and molecules having even a molecular weight of nearly 1000 can be evaporated.

Throughout the present specification, the epoxy equivalent of an epoxy group-containing copolymer is determined by the following method.

In principle, hydrochloric acid and an epoxy group are reacted, the residual amount of hydrochloric acid is determined by titrating with an alkali, and the amount of hydrochloric acid that reacted is determined to calculate the amount of the epoxy group present in the resin. A sample having about 2-4 mmole equivalents of the epoxy group which is smaller than the amount of hydrochloric acid to be used for the reaction is precisely weighed out, placed in a 200 mL stoppered Erlenmeyer flask, to which 25 mL of 0.2 M hydrochloric acid-dioxane solution is added using a volumetric pipette to dissolve the sample, and then allowed to stand at room temperature for 30 minutes. Then, 10 mL of methyl cellosolve is added while rinsing the stopper and the inner wall of the Erlenmeyer flask, then 4-6 drops of 0.1% cresol red-ethanol solution is added as an indicator, and the sample is stirred sufficiently until it becomes homogeneous. This is titrated with a 0.1 M potassium hydroxide-ethanol solution, and when the blue-purple color of the indicator remains for 30 seconds, it is the endpoint of neutralization. A value obtained by calculating the result according to the following equation is determined as the epoxy equivalent of the resin.

Epoxy equivalent (g/eq.)=$(10000 \times S)/[(B-A) \times f]$

S: Amount of sample (g)
A: Amount used of a 0.1 M potassium hydroxide-ethanol solution (mL)
B: Amount used of a 0.1 M potassium hydroxide-ethanol solution in a blank test (mL)
f: Factor of a 0.1 M potassium hydroxide-ethanol solution In order to determine the number average molecular weight, Mn, gel permeation chromatography (hereinafter referred to as GPC) was used, and the result was converted to the value of polystyrene (reference standard, manufactured by Showa Denko K.K., STANDARD SM-105 was used).

The measurement condition of GPC was as follows:
Instrument: HPLC unit HSS-2000 manufactured by JASCO Corp.
Column: Shodex column LF-804
Mobile phase: Tetrahydrofuran
Flow rate: 1.0 mL/min
Detector: RI-2031 Plus manufactured by JASCO Corp.
Temperature: 40.0° C.
Sample volume: Sample loop 100 μL
Sample concentration: Prepared at about 0.1% with tetrahydrofuran

EXAMPLES

The present invention will now be specifically explained with reference to examples, but the present invention is not limited to these examples in any way.

Working Example 1

Figure 2:
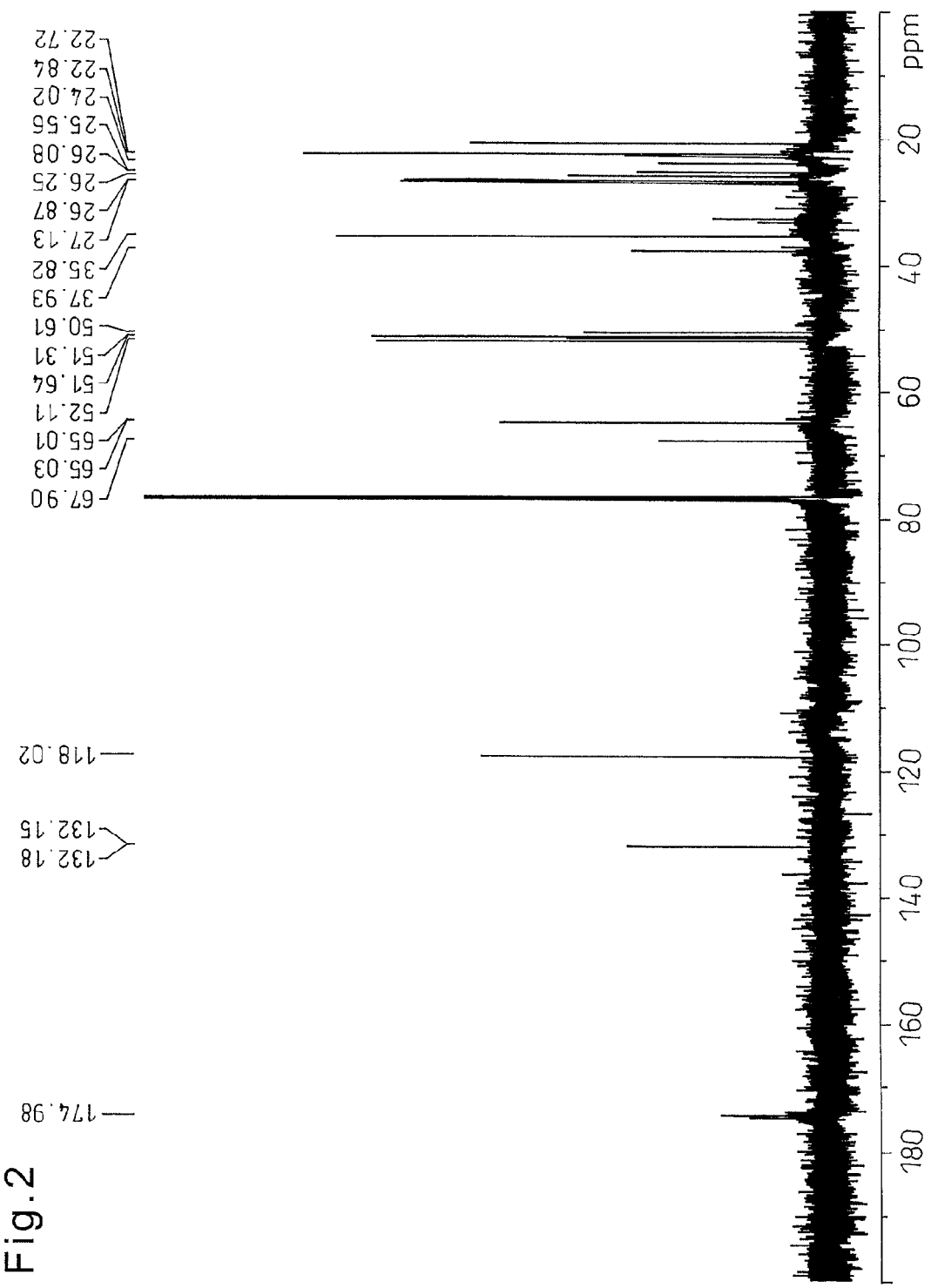
FIG. 2 A chart showing the $^{13}$C-NMR spectrum of a product obtained in Working Example 1.
Figure 3:
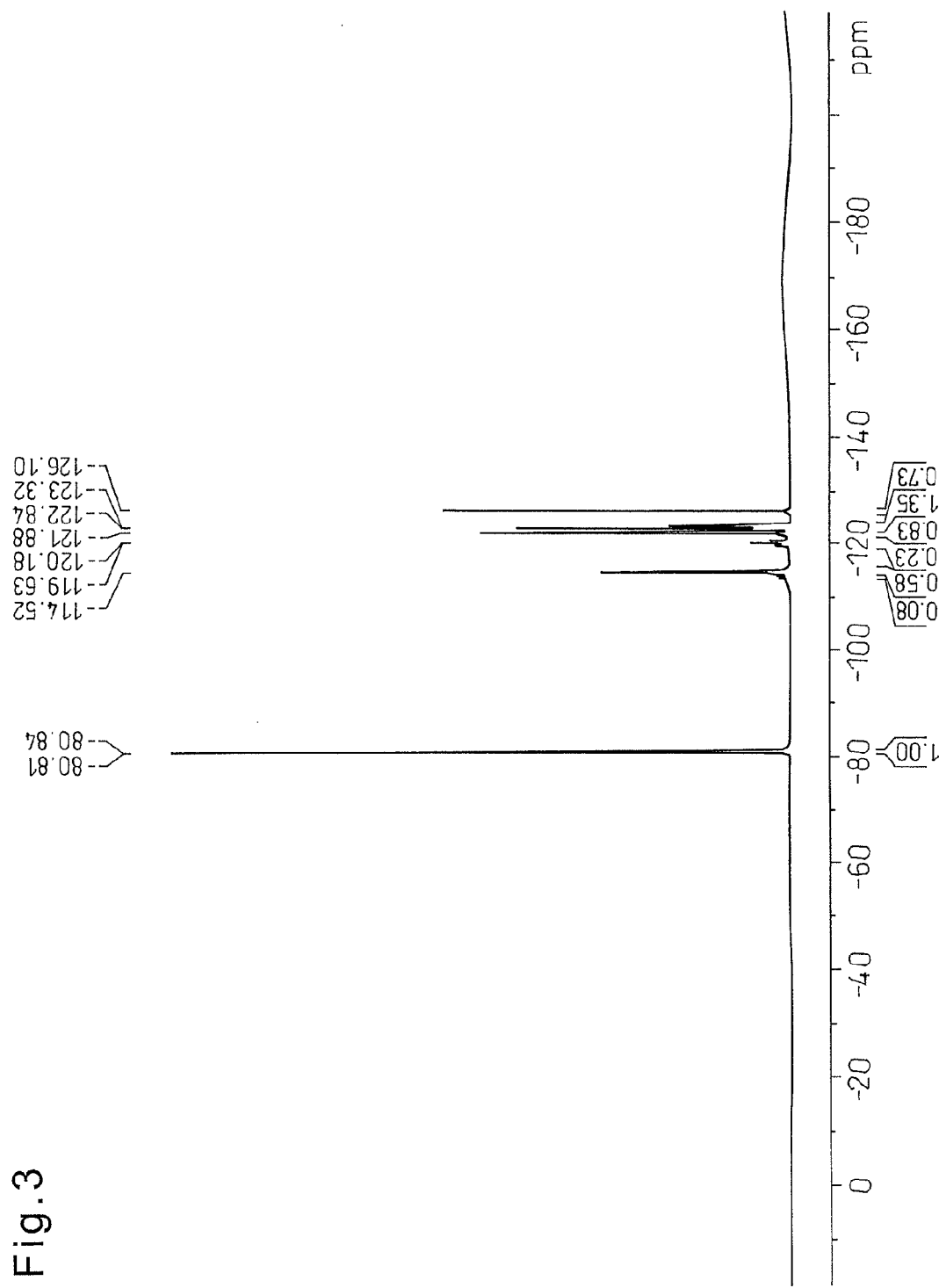
FIG. 3 A chart showing the $^{19}$F-NMR spectrum of a product obtained in Working Example 1.
Figure 4:
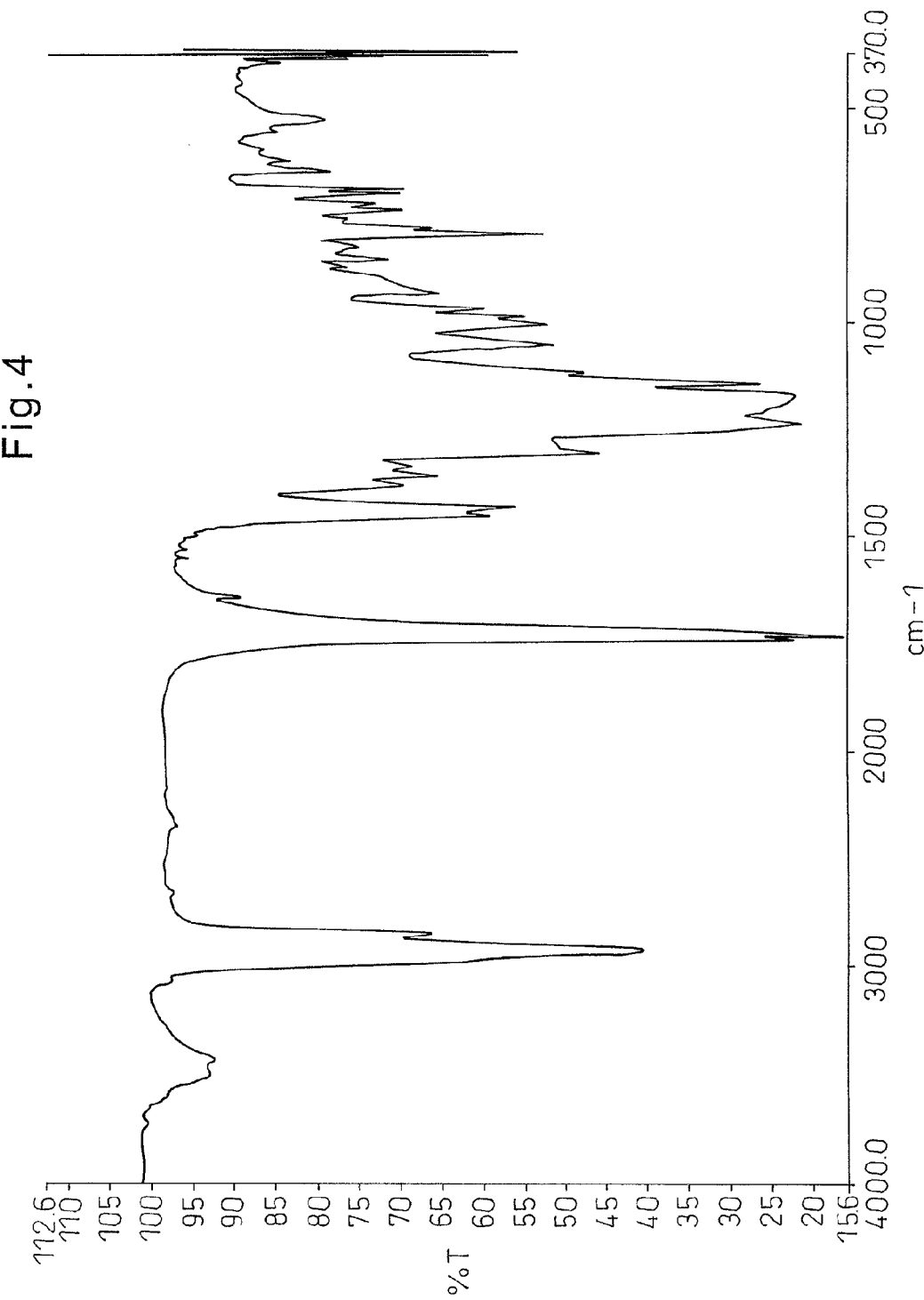
FIG. 4 A chart showing the IR spectrum of a product obtained in Working Example 1.

To a personal organic synthesis instrument PPV-4060 (a simple-type autoclave) manufactured by Tokyo Rikakikai Co., Ltd., 15.0 g (82.3 mmol) of 3,4-epoxycyclohexane-1-carboxylic acid allylester (hereinafter referred to as CEA, manufactured by Showa Denko K.K.), 7.12 g (20.6 mmol) of perfluorohexylethylene (hereinafter referred to as PFHE, CHEMINOX PFHE manufactured by Unimatec Co., Ltd.), 0.768 g of di-t-butyl peroxide (PERBUTYL-D manufactured by NOF Corp., purity: 98%, 5.14 mmol), and 11.1 g of cyclohexane were fed, and after purging with nitrogen, the reaction vessel was sealed and reacted at 160° C. for 4 hours. Calculation of the ratio of each component contained in the copolymer from the conversion rate of the feed revealed that the repeating units based on CEA were 78 mole % and the repeating units based on PFHE were 22 mole %. After the reaction was completed, unreacted perfluorohexylethylene and cyclohexane in the reaction mixture were evaporated by an evaporator. The epoxy equivalent of the product obtained was 328 g/eq., and GPC analysis indicated a number average molecular weight of 731 and a weight average molecular weight of 2020. The $^1$H-NMR, $^{13}$C-NMR, $^{19}$F-NMR, and IR spectra of the product obtained are shown in FIGS. 1 to 4.

Working Example 2

Figure 5:
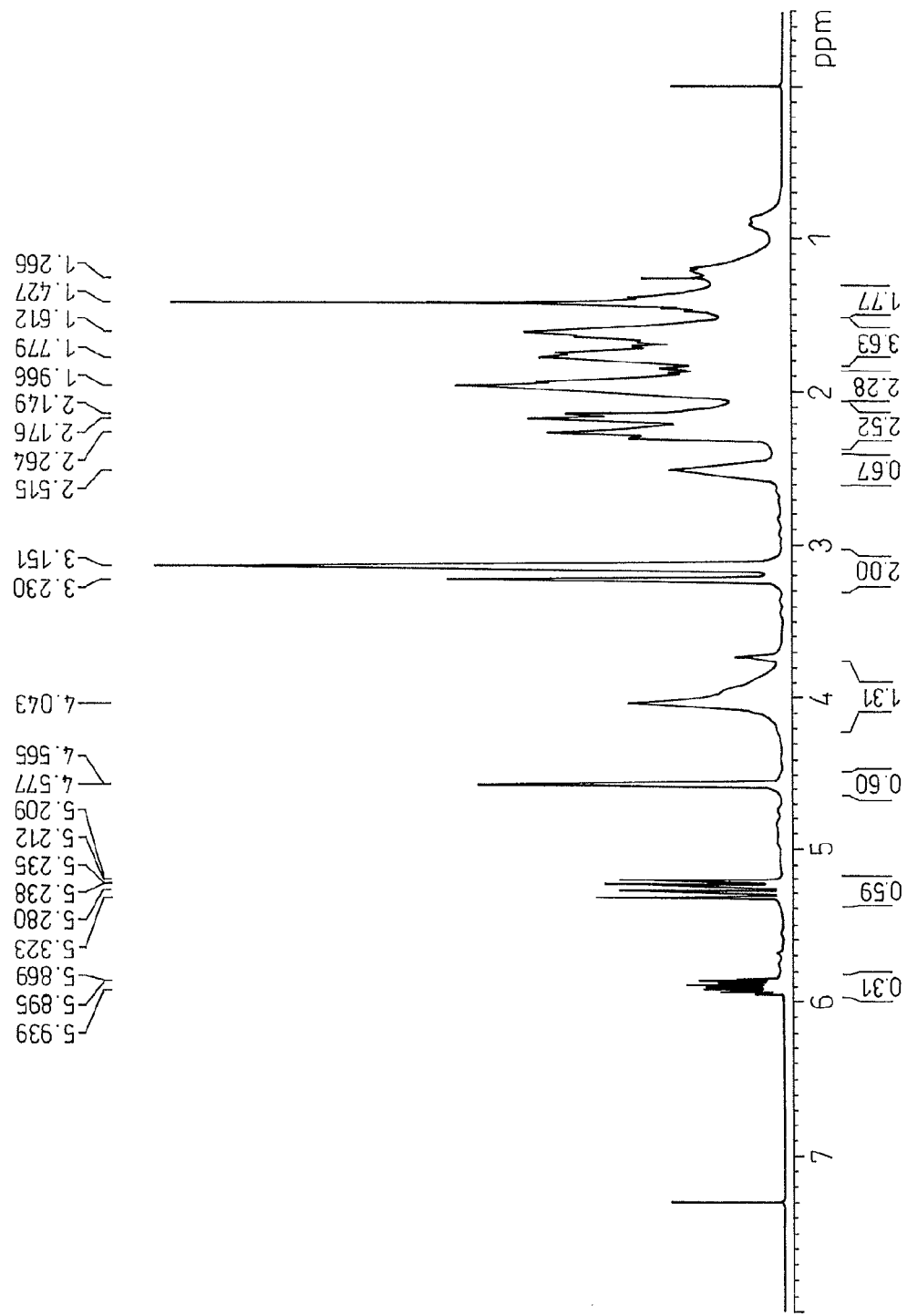
FIG. 5 A chart showing the $^1$H-NMR spectrum of a product obtained in Working Example 2.
Figure 6:
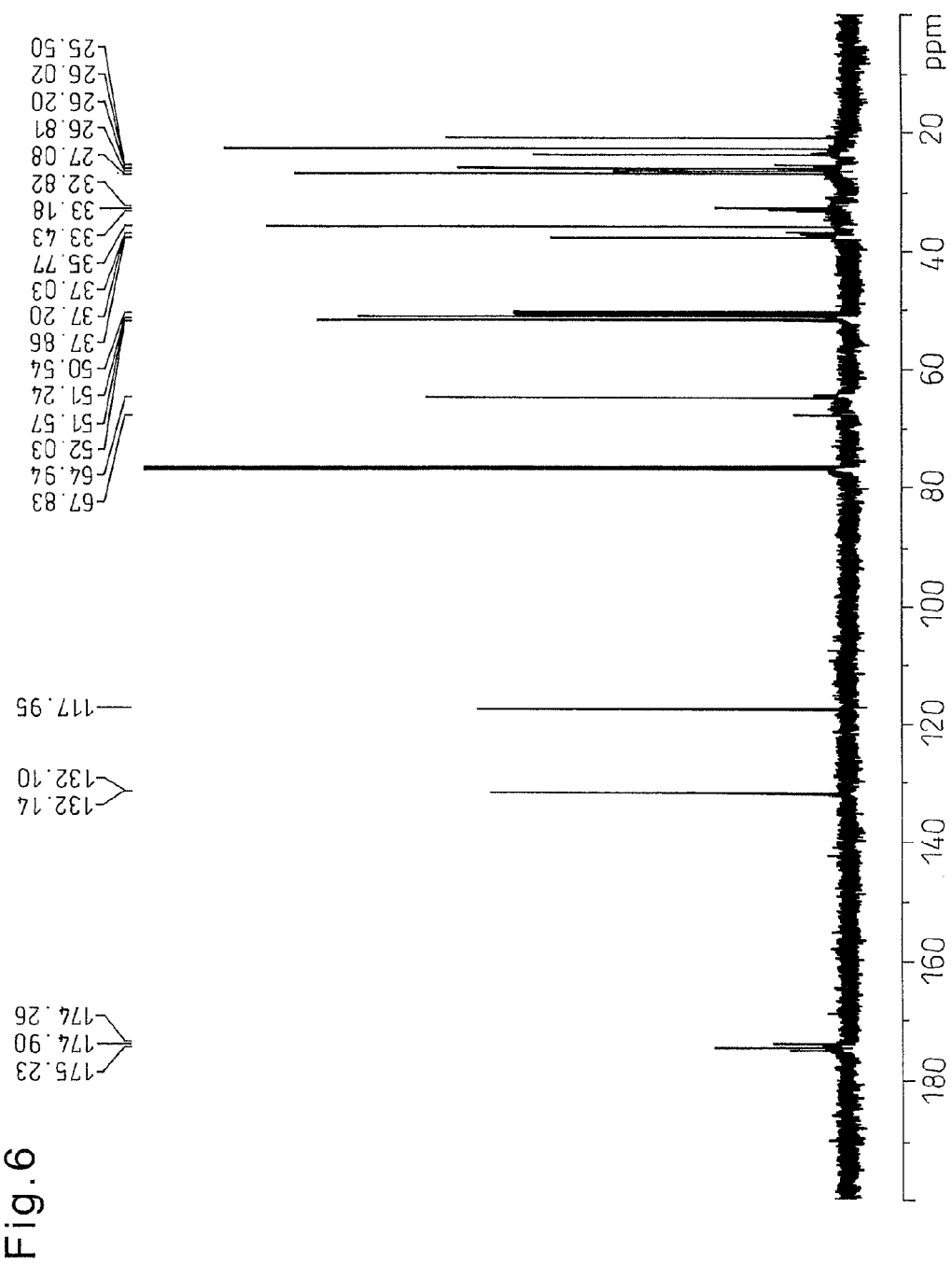
FIG. 6 A chart showing the $^{13}$C-NMR spectrum of a product obtained in Working Example 2.
Figure 7:
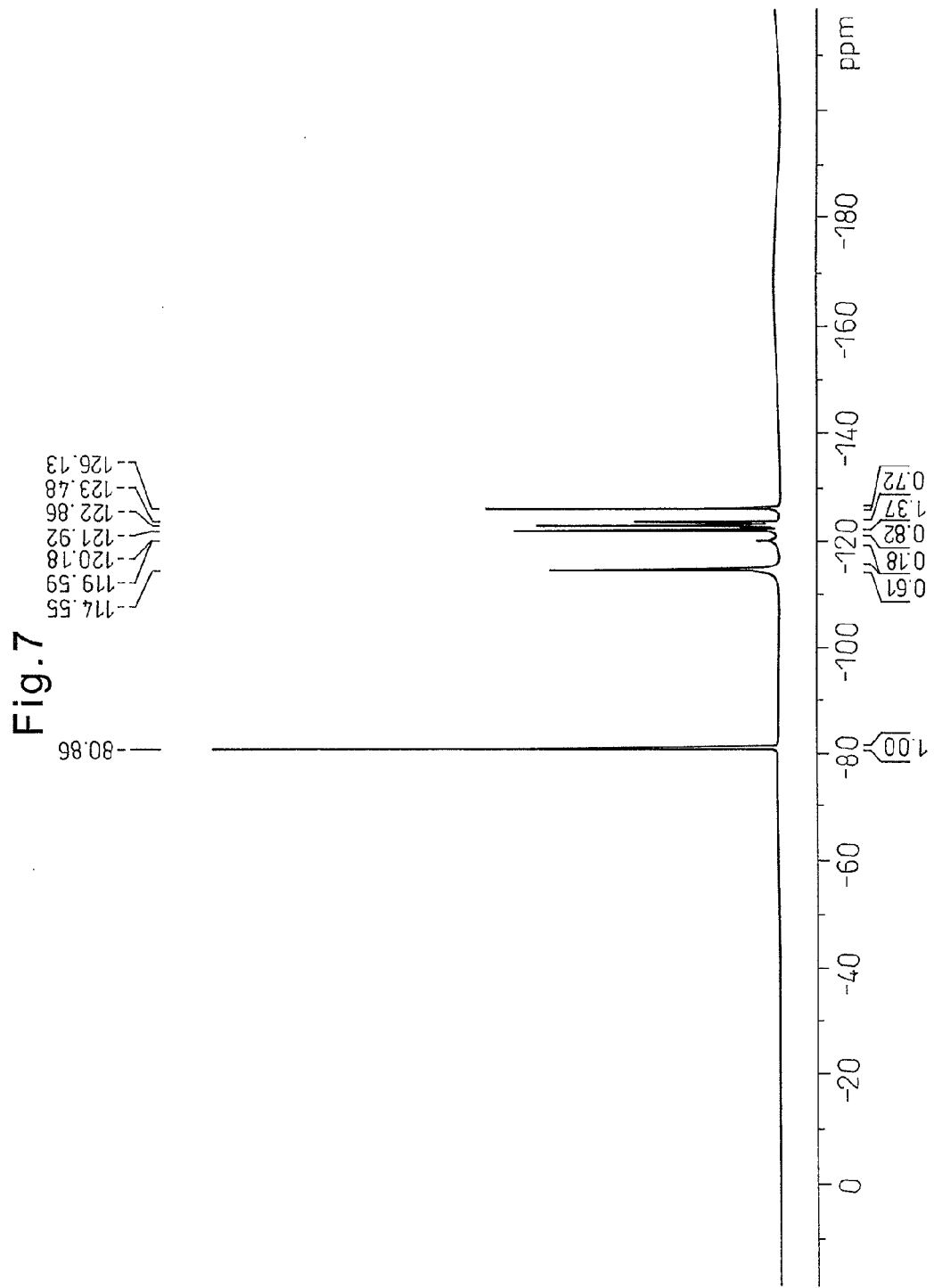
FIG. 7 A chart showing the $^{19}$F-NMR spectrum of a product obtained in Working Example 2.
Figure 8:
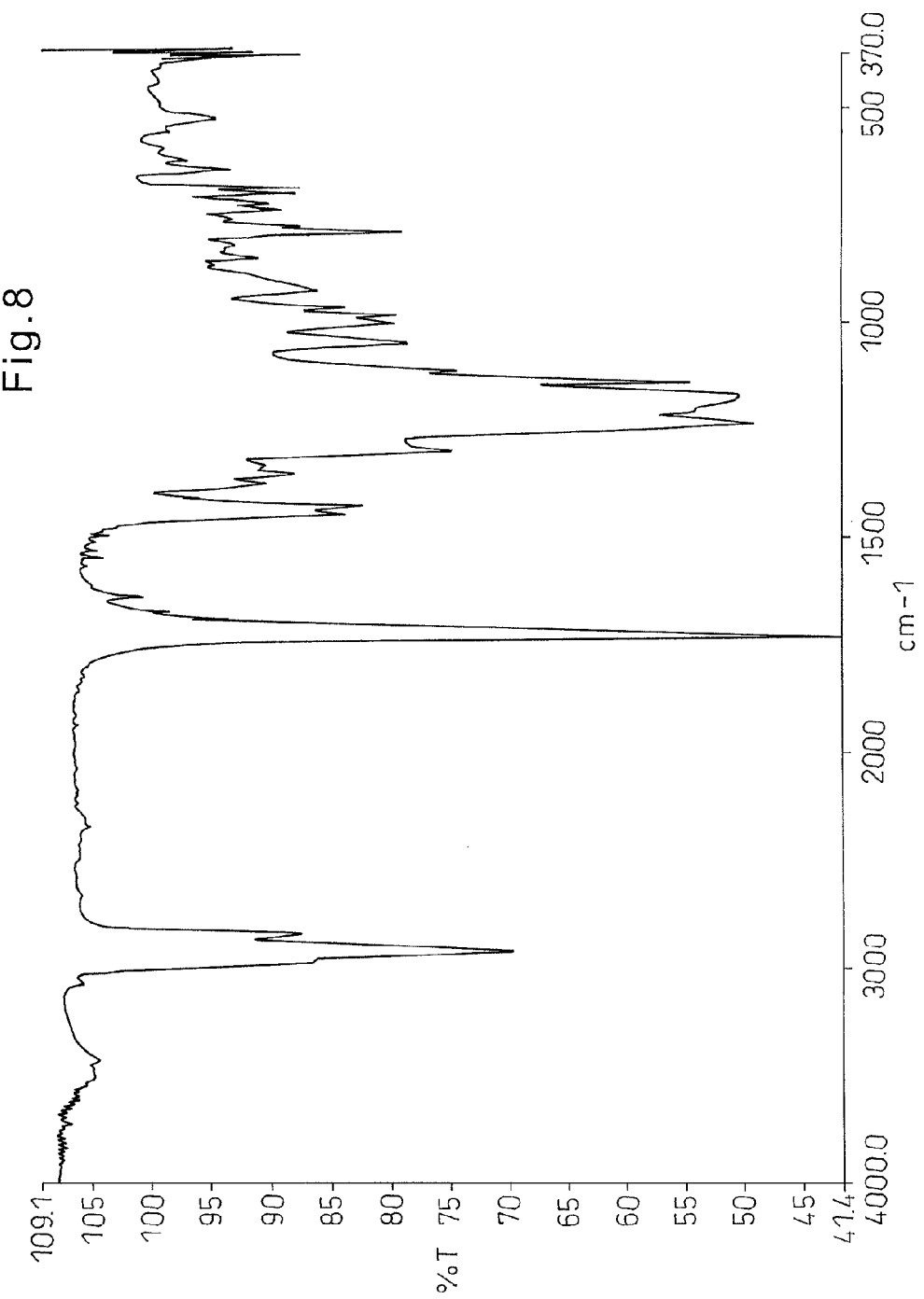
FIG. 8 A chart showing the IR spectrum of a product obtained in Working Example 2.

To a personal organic synthesis instrument PPV-4060 (a simple-type autoclave) manufactured by Tokyo Rikakikai Co., Ltd., 10.0 g (54.9 mmol) of 3,4-epoxycyclohexane-1-carboxylic acid allylester (manufactured by Showa Denko K.K.), 9.50 g (27.4 mmol) of perfluorohexylethylene (CHEMINOX PFHE manufactured by Unimatec Co., Ltd.), 0.614 g of di-t-butyl peroxide (PERBUTYL-D manufactured by NOF Corp., purity: 98%, 4.12 mmol), and 9.75 g of cyclohexane were fed, and after purging with nitrogen, the reaction vessel was sealed and reacted at 160° C. for 4 hours. Calculation of the ratio of each component contained in the copolymer from the conversion rate of the feed revealed that the repeating units based on CEA were 63 mole % and the repeating units based on PFHE were 37 mole %. After the reaction was completed, unreacted perfluorohexylethylene and cyclohexane were evaporated by an evaporator. The epoxy equivalent of the product obtained was 472 g/eq., and GPC analysis indicated a number average molecular weight of 840 and a weight average molecular weight of 2110. The $^1$H-NMR, $^{13}$C-NMR, $^{19}$F-NMR, and IR spectra of the product obtained are shown in FIGS. 5 to 8.

Working Example 3

Figure 9:
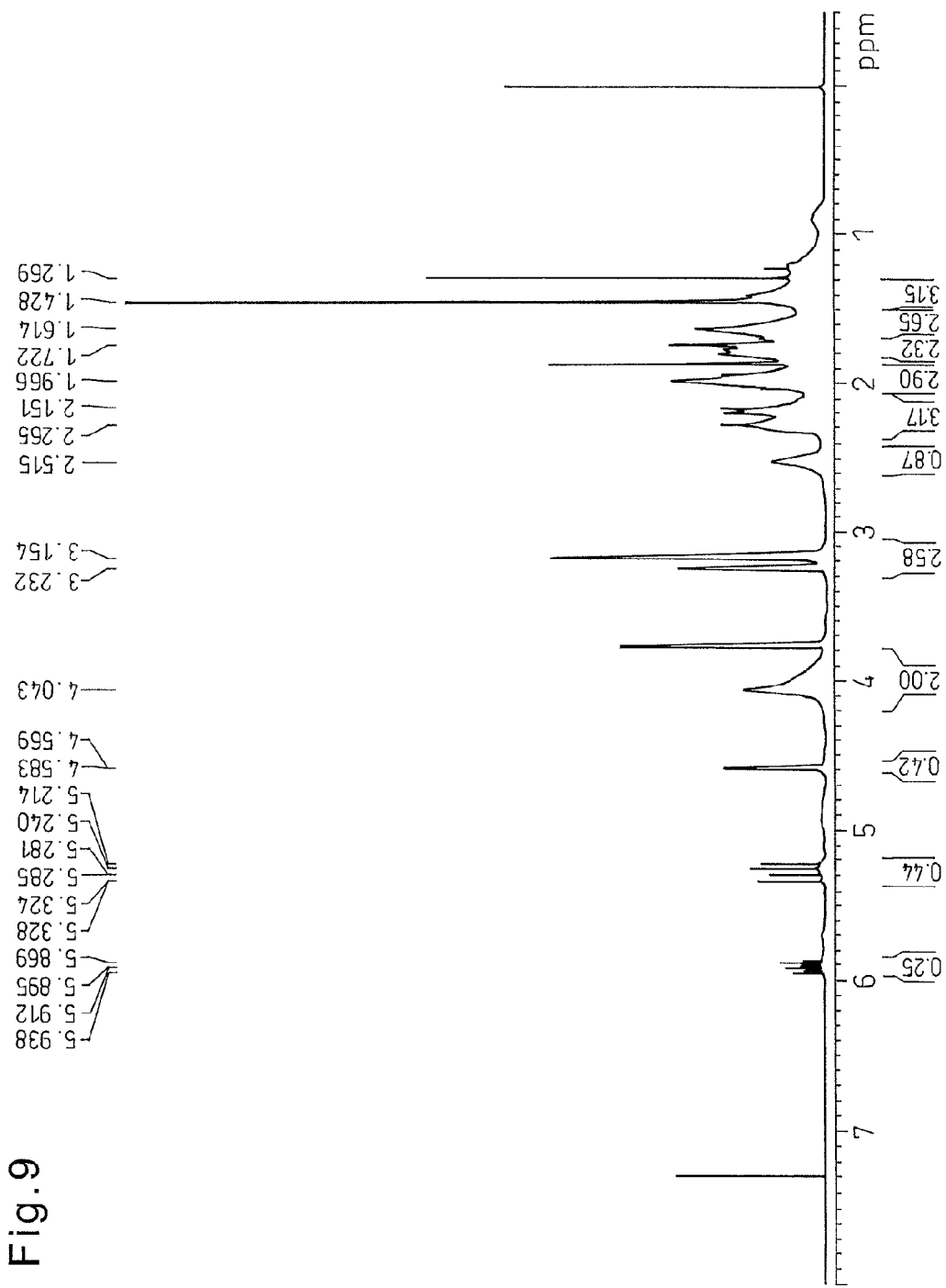
FIG. 9 A chart showing the $^1$H-NMR spectrum of a product obtained in Working Example 3.
Figure 10:
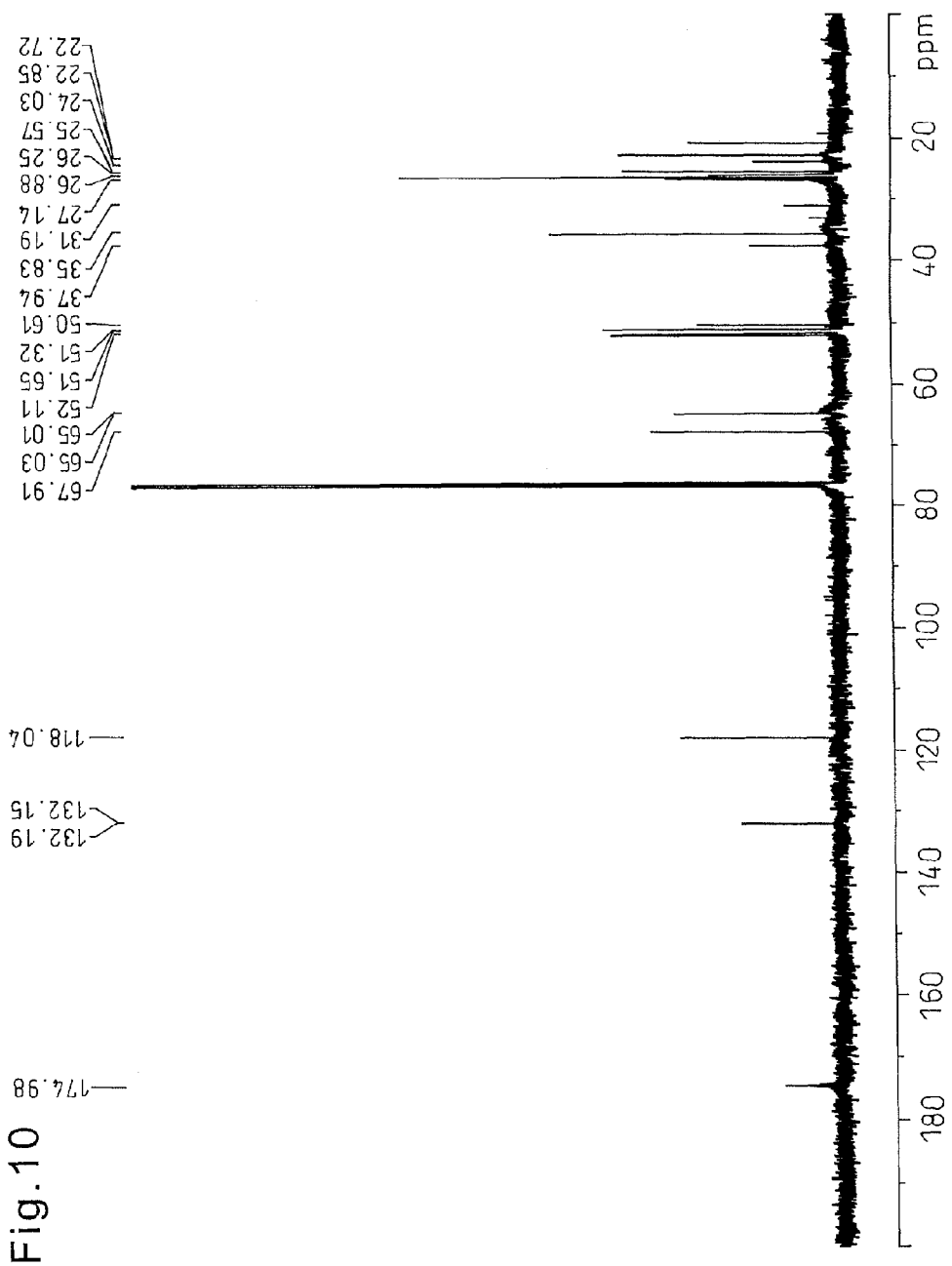
FIG. 10 A chart showing the $^{13}$C-NMR spectrum of a product obtained in Working Example 3.
Figure 11:
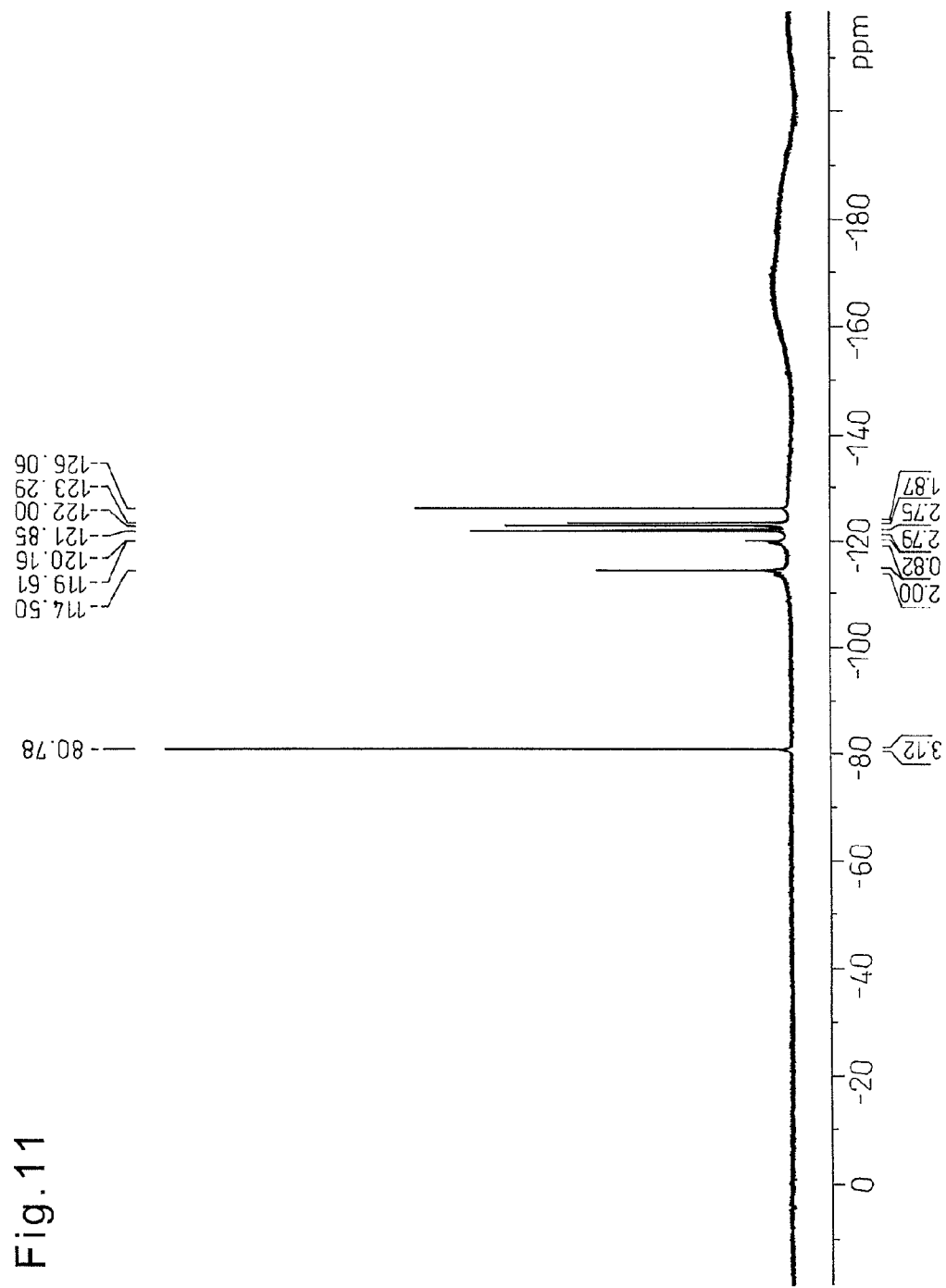
FIG. 11 A chart showing the $^{19}$F-NMR spectrum of a product obtained in Working Example 3.
Figure 12:
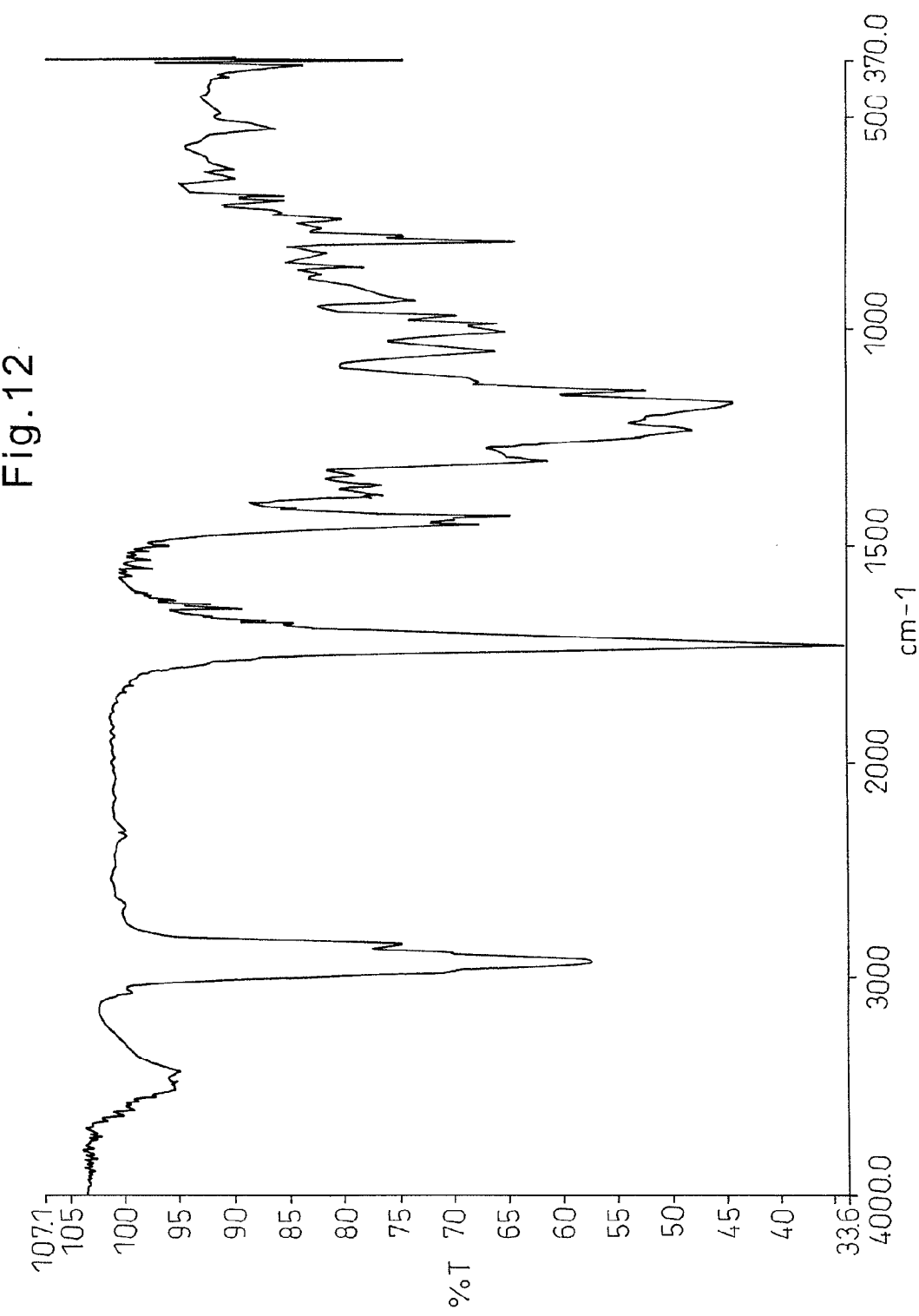
FIG. 12 A chart showing the IR spectrum of a product obtained in Working Example 3.

To a personal organic synthesis instrument PPV-4060 (a simple-type autoclave) manufactured by Tokyo Rikakikai Co., Ltd., 20.0 g (110 mmol) of 3,4-epoxycyclohexane-1-carboxylic acid allylester (manufactured by Showa Denko K.K.), 3.80 g (11.0 mmol) of perfluorohexylethylene (CHEMINOX PFHE manufactured by Unimatec Co., Ltd.), 0.901 g of di-t-butyl peroxide (PERBUTYL-D manufactured by NOF Corp., purity: 98%, 6.04 mmol), and 11.9 g of cyclohexane were fed, and after purging with nitrogen, the reaction vessel was sealed and reacted at 160° C. for 4 hours. Calculation of the ratio of each component contained in the copolymer from the conversion rate of the feed revealed that the repeating units based on CEA were 90 mole % and the repeating units based on PFHE were 10 mole %. After the reaction was completed, unreacted perfluorohexylethylene and cyclohexane were evaporated by an evaporator. The epoxy equivalent of the product obtained was 266 g/eq., and GPC analysis indicated a number average molecular weight of 955 and a weight average molecular weight of 2830. The $^1$H-NMR, $^{13}$C-NMR, $^{19}$F-NMR, and IR spectra of the product obtained are shown in FIGS. 9 to 12.

Working Example 4

Figure 13:
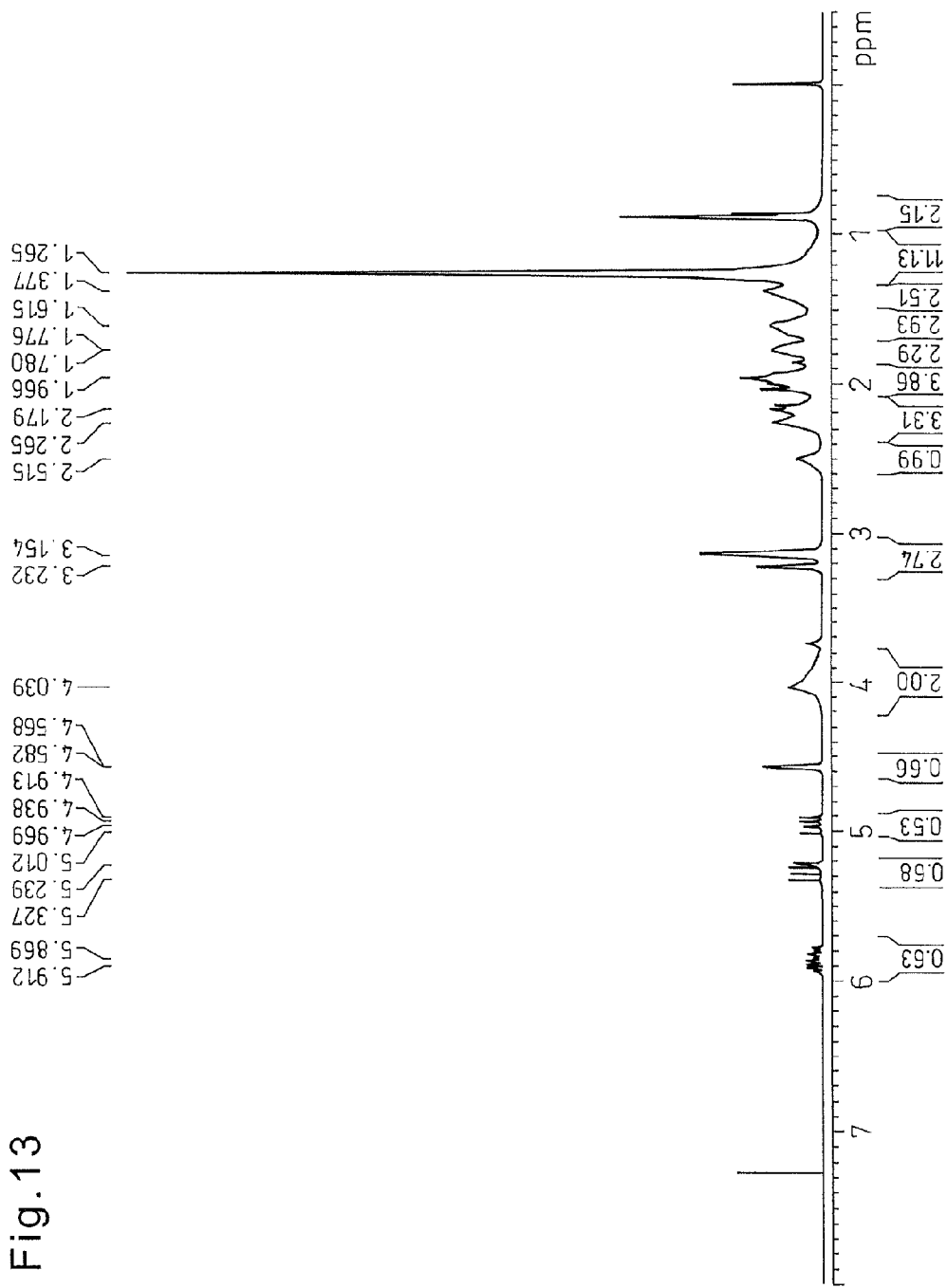
FIG. 13 A chart showing the $^1$H-NMR spectrum of a product obtained in Working Example 4.
Figure 14:
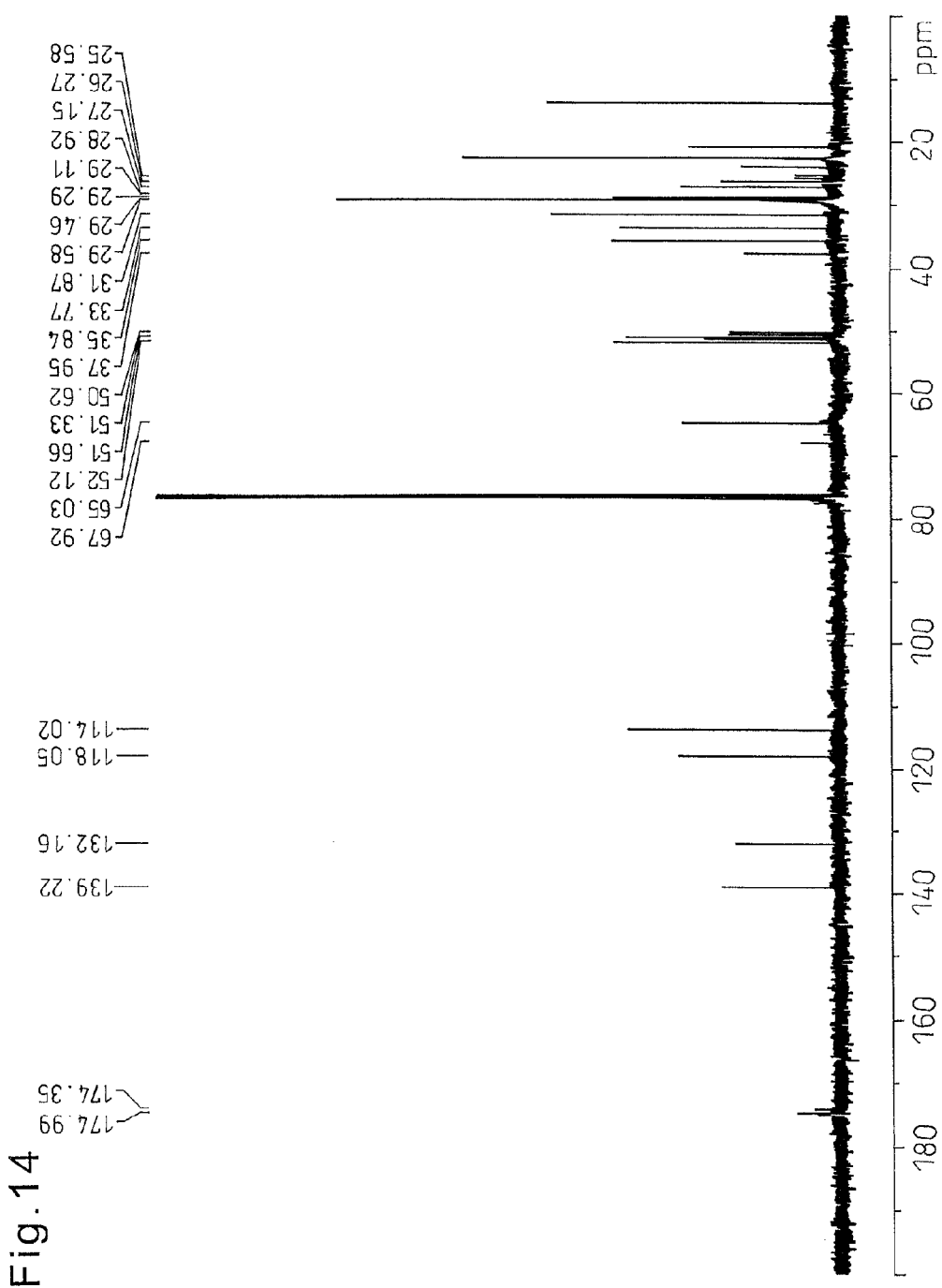
FIG. 14 A chart showing the $^{13}$C-NMR spectrum of a product obtained in Working Example 4.
Figure 15:
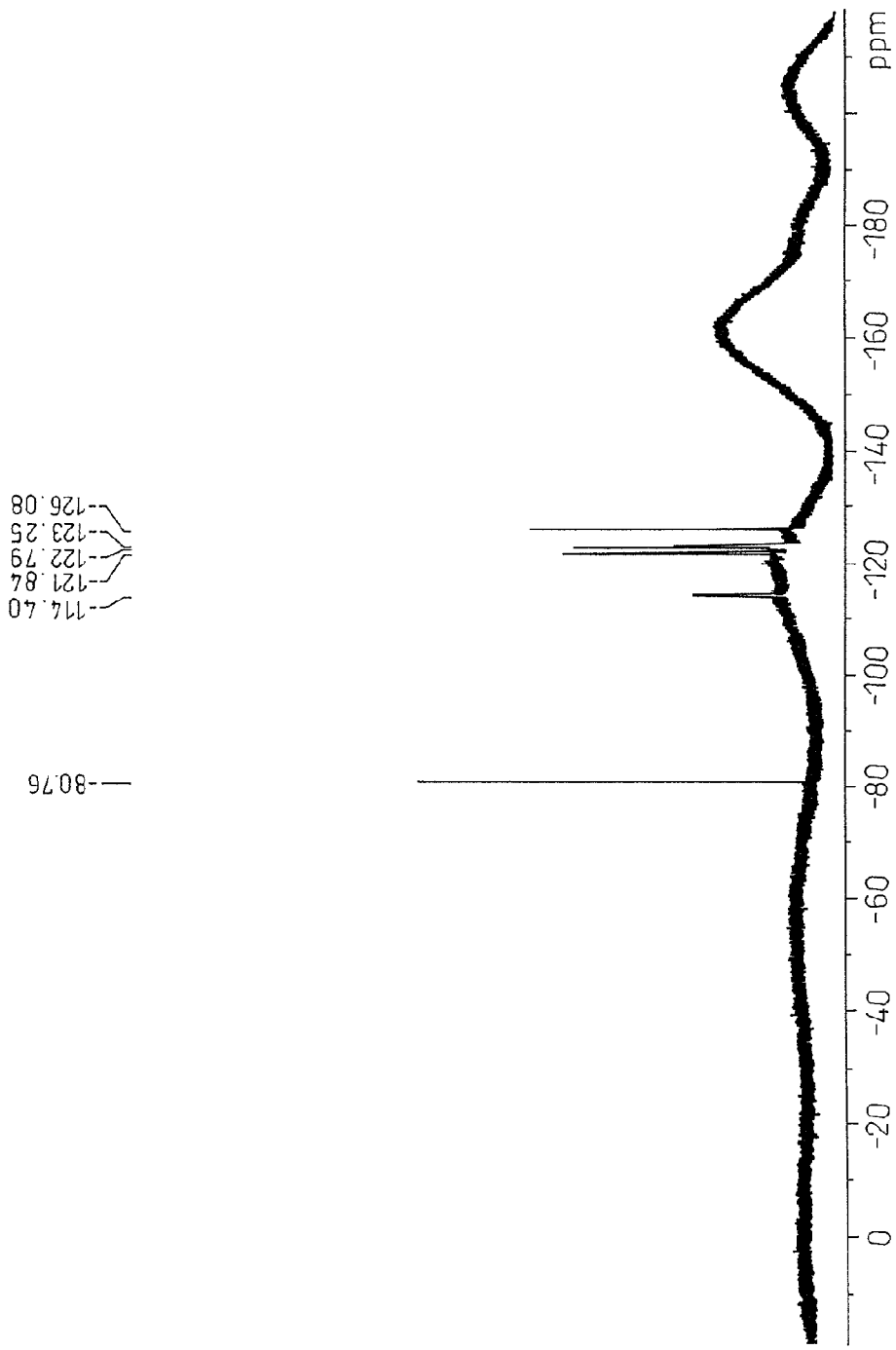
FIG. 15 A chart showing the $^{19}$F-NMR spectrum of a product obtained in Working Example 4.
Figure 16:
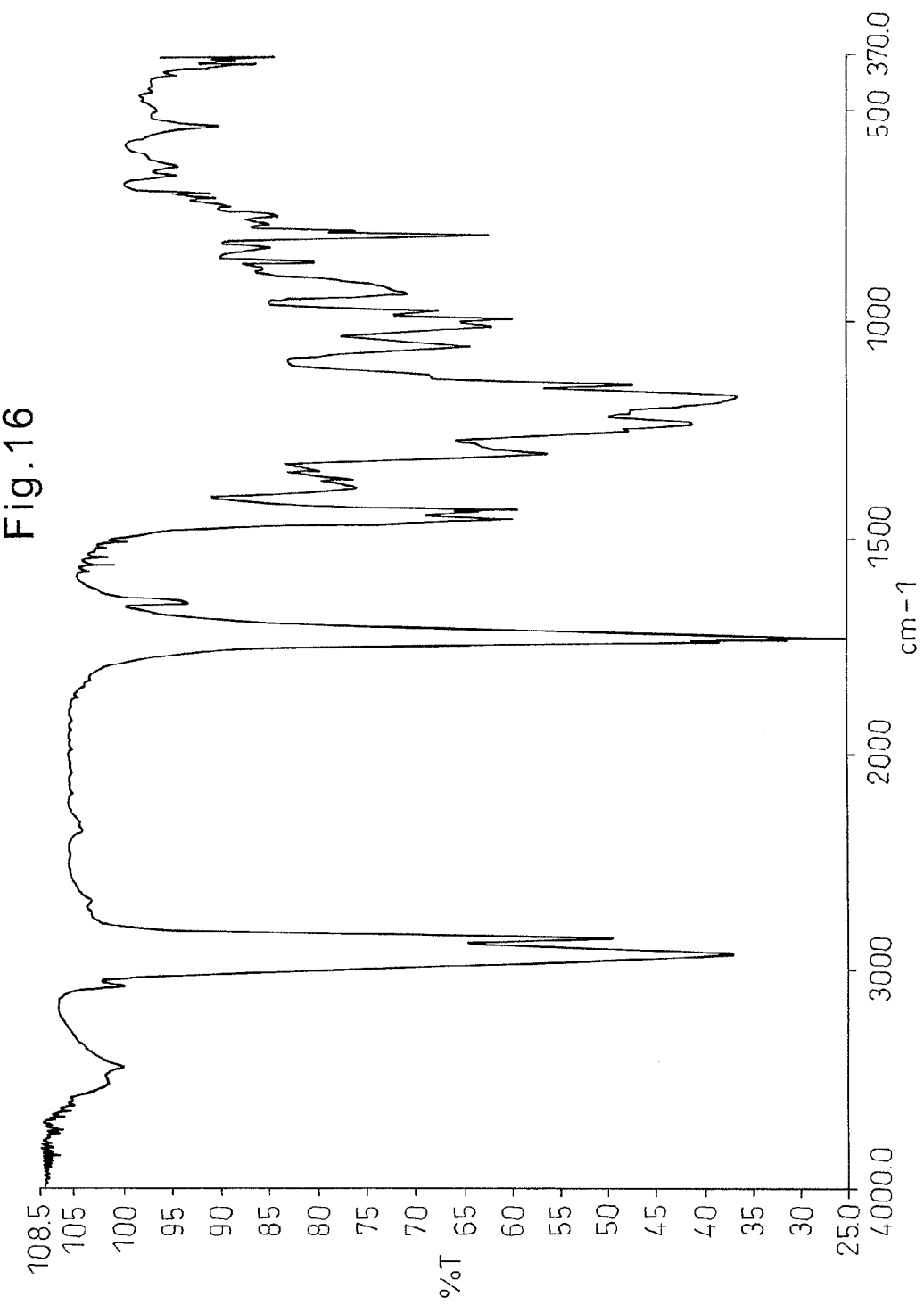
FIG. 16 A chart showing the IR spectrum of a product obtained in Working Example 4.

To a personal organic synthesis instrument PPV-4060 (a simple-type autoclave) manufactured by Tokyo Rikakikai Co., Ltd., 14.0 g (76.8 mmol) of 3,4-epoxycyclohexane-1-carboxylic acid allylester (manufactured by Showa Denko K.K.), 2.66 g (7.68 mmol) of perfluorohexylethylene (CHEMINOX PFHE manufactured by Unimatec Co., Ltd.), 5.42 g of 1-dodecene (Linealene manufactured by Idemitsu Kosan Co., Ltd., 30.7 mmol), and 0.843 g of di-t-butyl peroxide (PERBUTYL-D manufactured by NOF Corp., purity: 98%, 5.76 mmol) were fed, and after purging with nitrogen, the reaction vessel was sealed and reacted at 160° C. for 4 hours. Calculation of the ratio of each component contained in the copolymer from the conversion rate of the feed revealed that the repeating units based on CEA were 68 mole %, the repeating units based on PFHE were 7 mole %, and the repeating units based on 1-decene were 25 mole %. After the reaction was completed, unreacted perfluorohexylethylene and cyclohexane were evaporated by an evaporator. The epoxy equivalent of the product obtained was 311 g/eq., and GPC analysis indicated a number average molecular weight of 883 and a weight average molecular weight of 2520. The $^1$H-NMR, $^{13}$C-NMR, $^{19}$F-NMR, and IR spectra of the product obtained are shown in FIGS. 13 to 16.

Working Example 5

Figure 17:
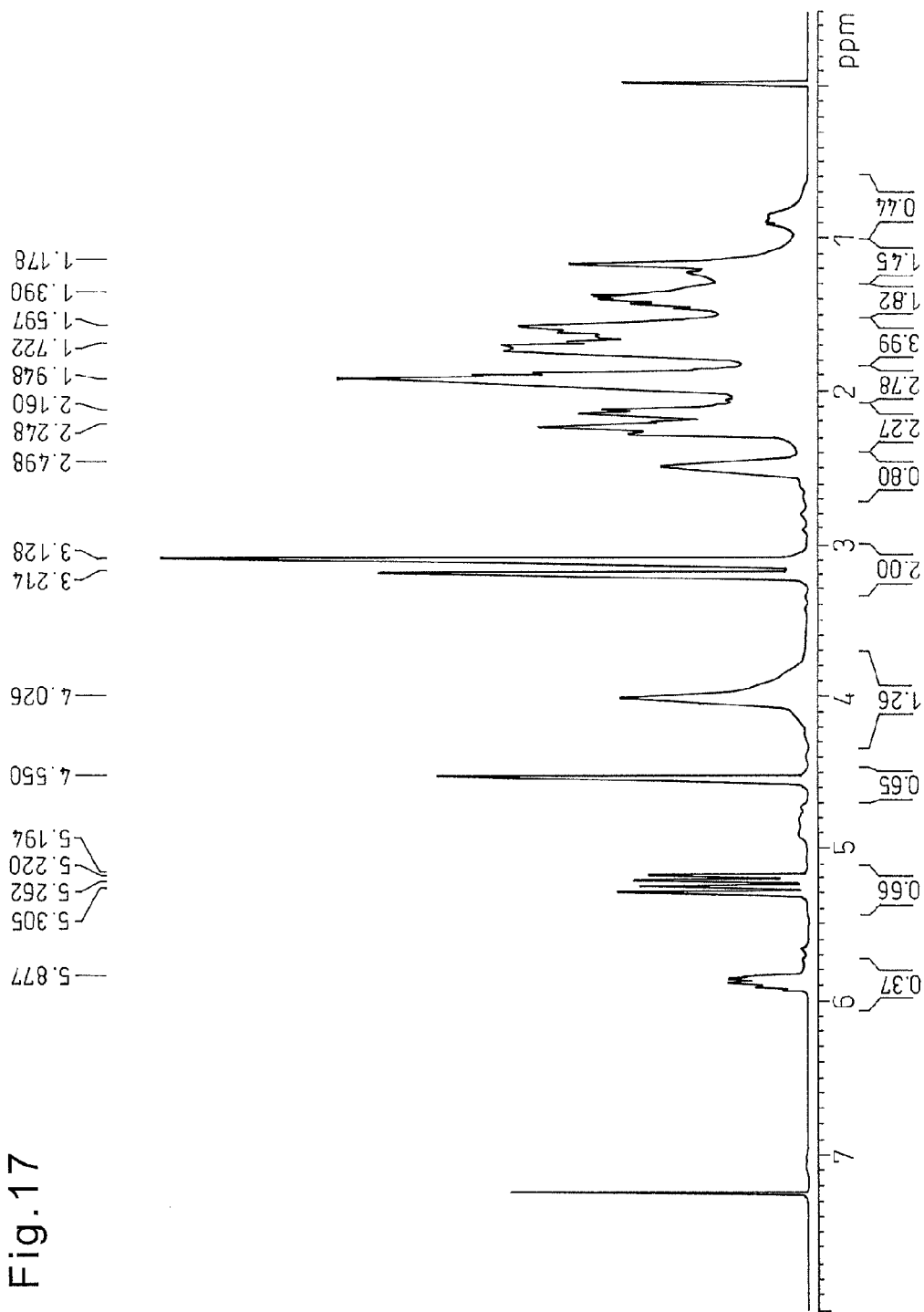
FIG. 17 A chart showing the $^1$H-NMR spectrum of a product obtained in Working Example 5.
Figure 18:
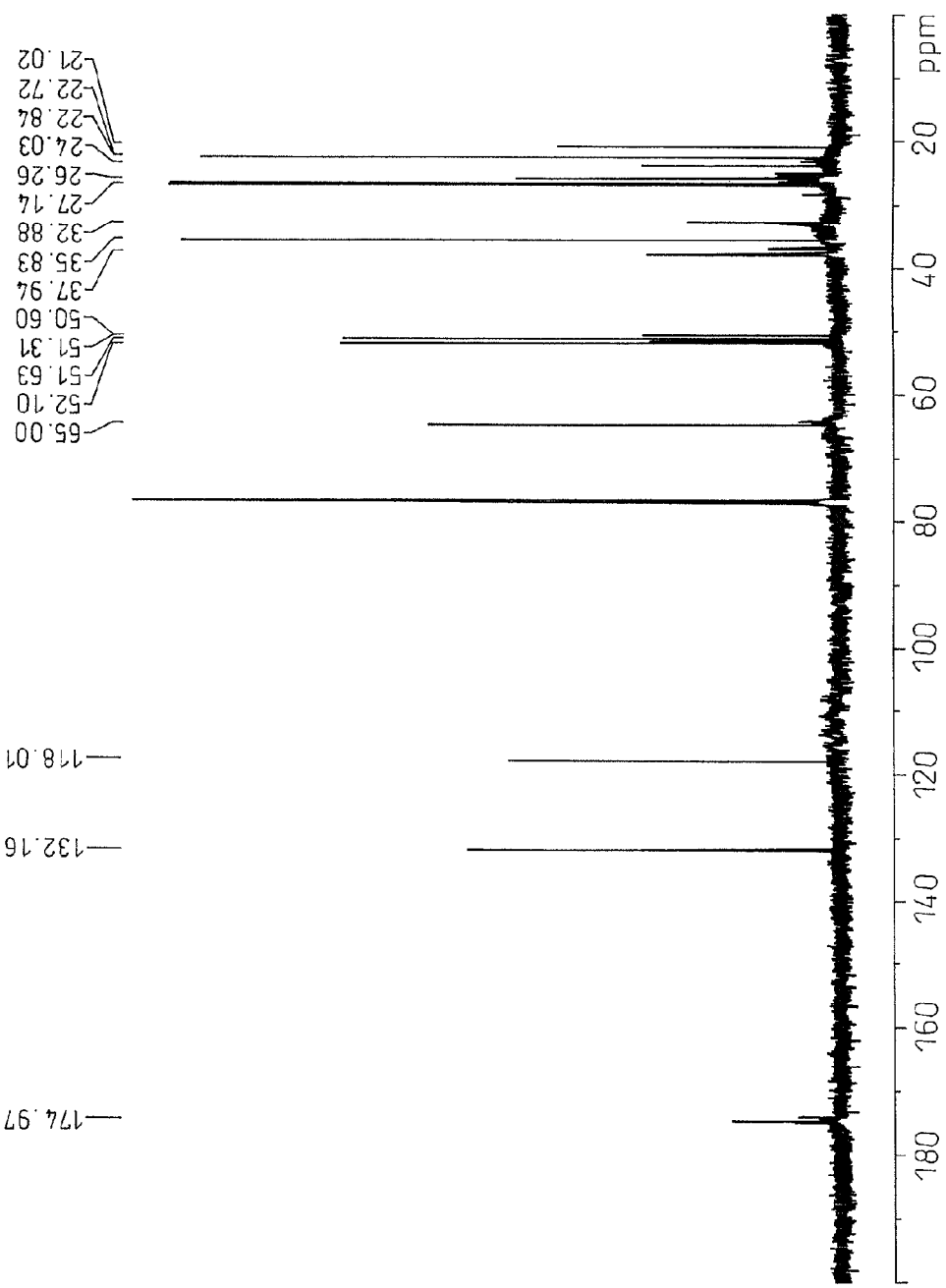
FIG. 18 A chart showing the $^{13}$C-NMR spectrum of a product obtained in Working Example 5.
Figure 19:
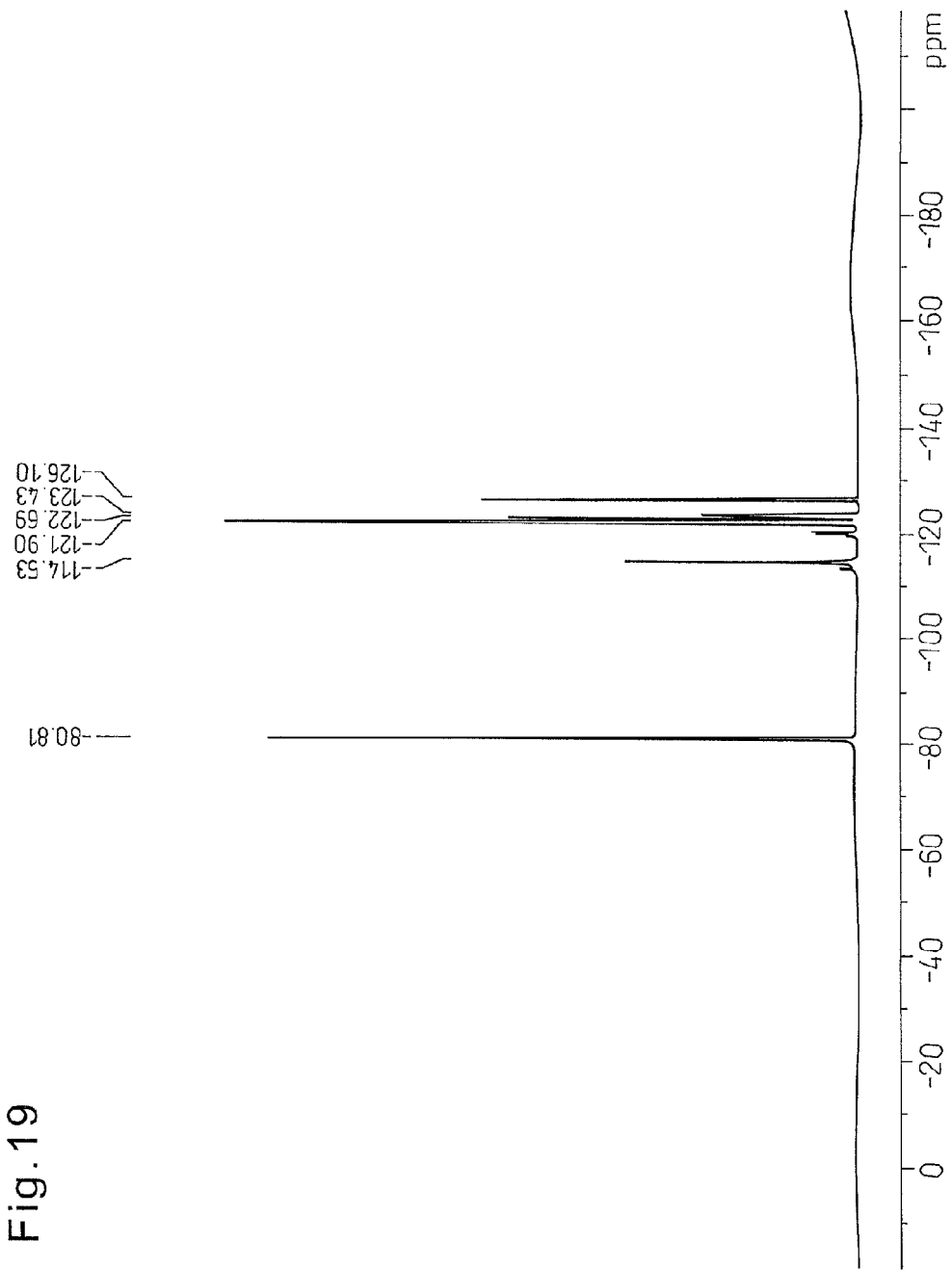
FIG. 19 A chart showing the $^{19}$F-NMR spectrum of a product obtained in Working Example 5.
Figure 20:
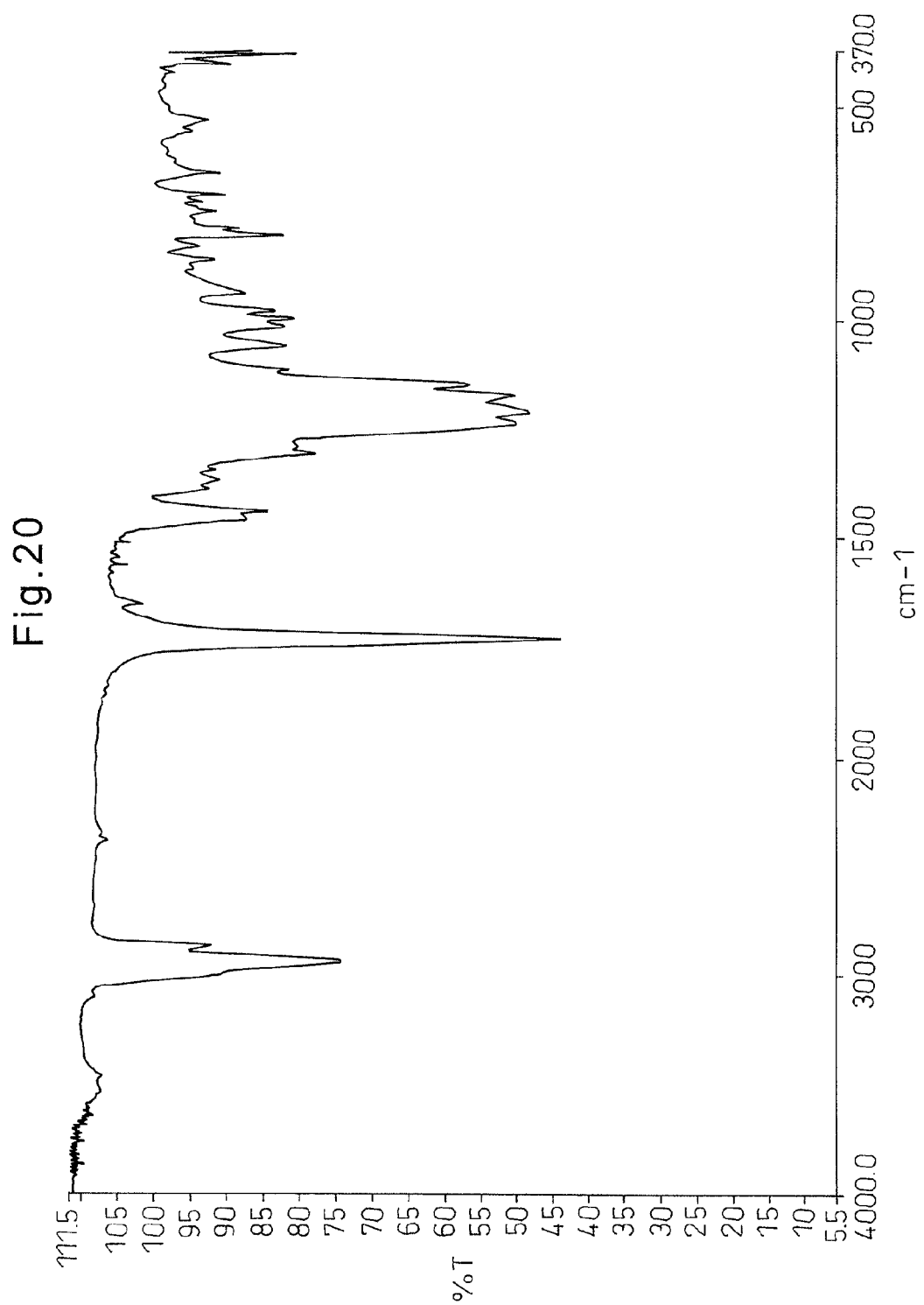
FIG. 20 A chart showing the IR spectrum of a product obtained in Working Example 5.

To a personal organic synthesis instrument PPV-4060 (a simple-type autoclave) manufactured by Tokyo Rikakikai Co., Ltd., 20.0 g (110 mmol) of 3,4-epoxycyclohexane-1-carboxylic acid allylester (manufactured by Showa Denko K.K.), 12.2 g (27 mmol) of perfluorooctylethylene (CHEMINOX PFOE manufactured by Unimatec Co., Ltd.), 1.01 g of di-t-butyl peroxide (PERBUTYL-D manufactured by NOF Corp., purity: 98%, 6.9 mmol), and 50 g of cyclohexane were fed, and after purging with nitrogen, the reaction vessel was sealed and reacted at 160° C. for 4 hours. Calculation of the ratio of each component contained in the copolymer from the conversion rate of the feed revealed that the repeating units based on CEA were 75 mole % and the repeating units based on PFOE were 25 mole %. After the reaction was completed, unreacted perfluorooctylethylene and cyclohexane were evaporated by an evaporator. The epoxy equivalent of the product obtained was 327 g/eq., and GPC analysis indicated a number average molecular weight of 1270 and a weight average molecular weight of 2009. The $^1$H-NMR, $^{13}$C-NMR, $^{19}$F-NMR, and IR spectra of the product obtained are shown in FIGS. 17 to 20.

Working Example 6

Figure 21:
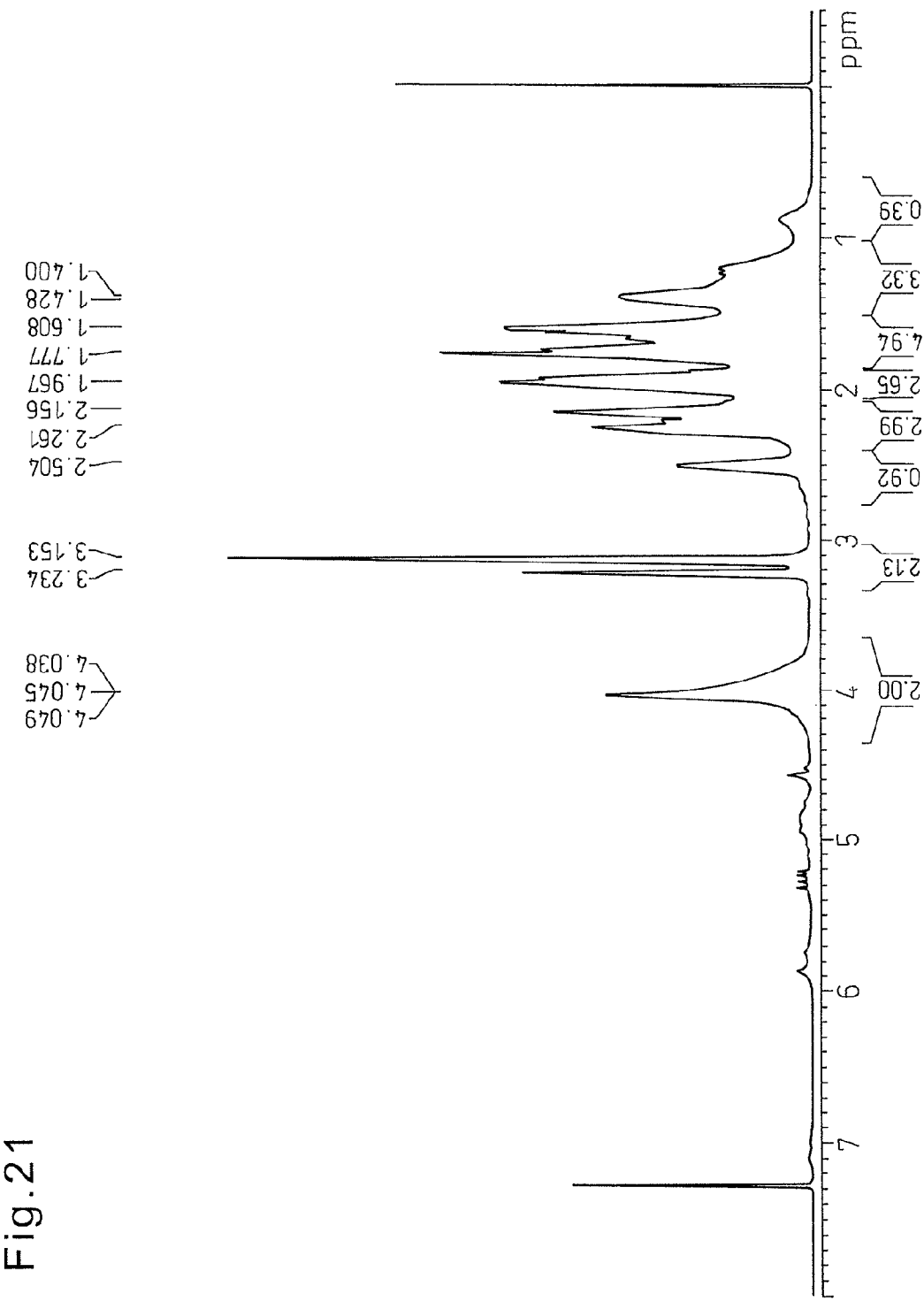
FIG. 21 A chart showing the $^1$H-NMR spectrum of a distillate obtained in Working Example 6.
Figure 22:
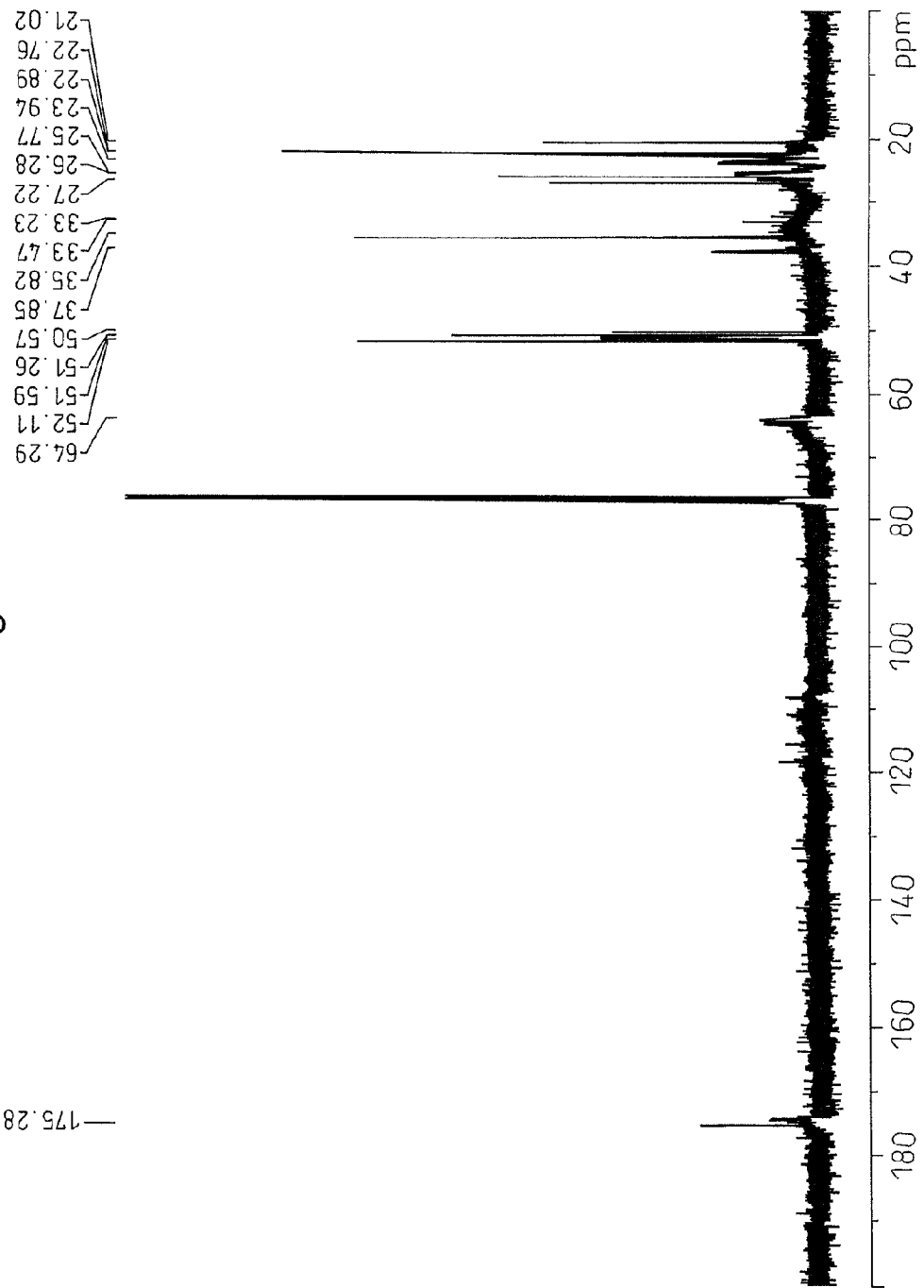
FIG. 22 A chart showing the $^{13}$C-NMR spectrum of a distillate obtained in Working Example 6.
Figure 23:
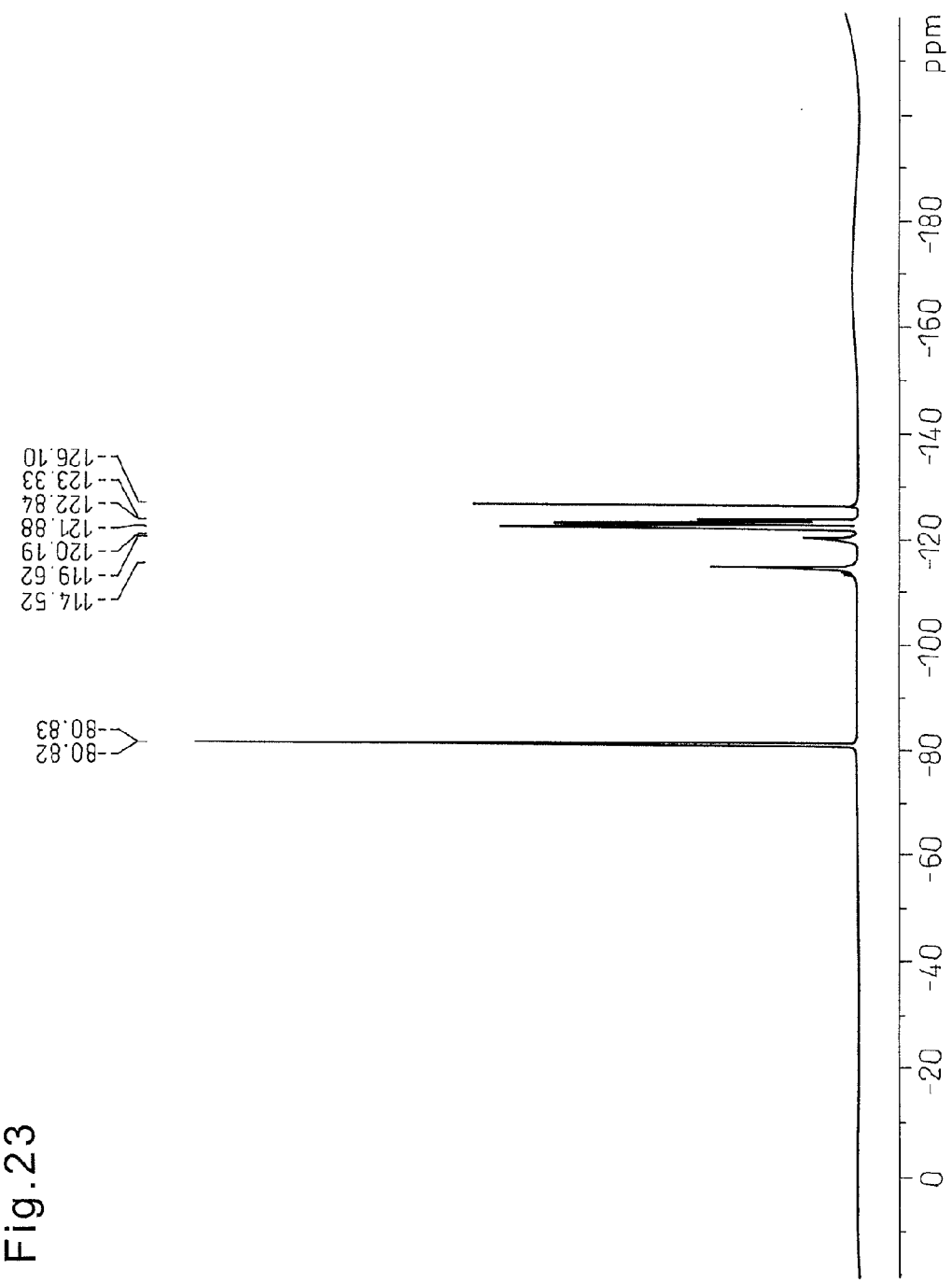
FIG. 23 A chart showing the $^{19}$F-NMR spectrum of a distillate obtained in Working Example 6.
Figure 24:
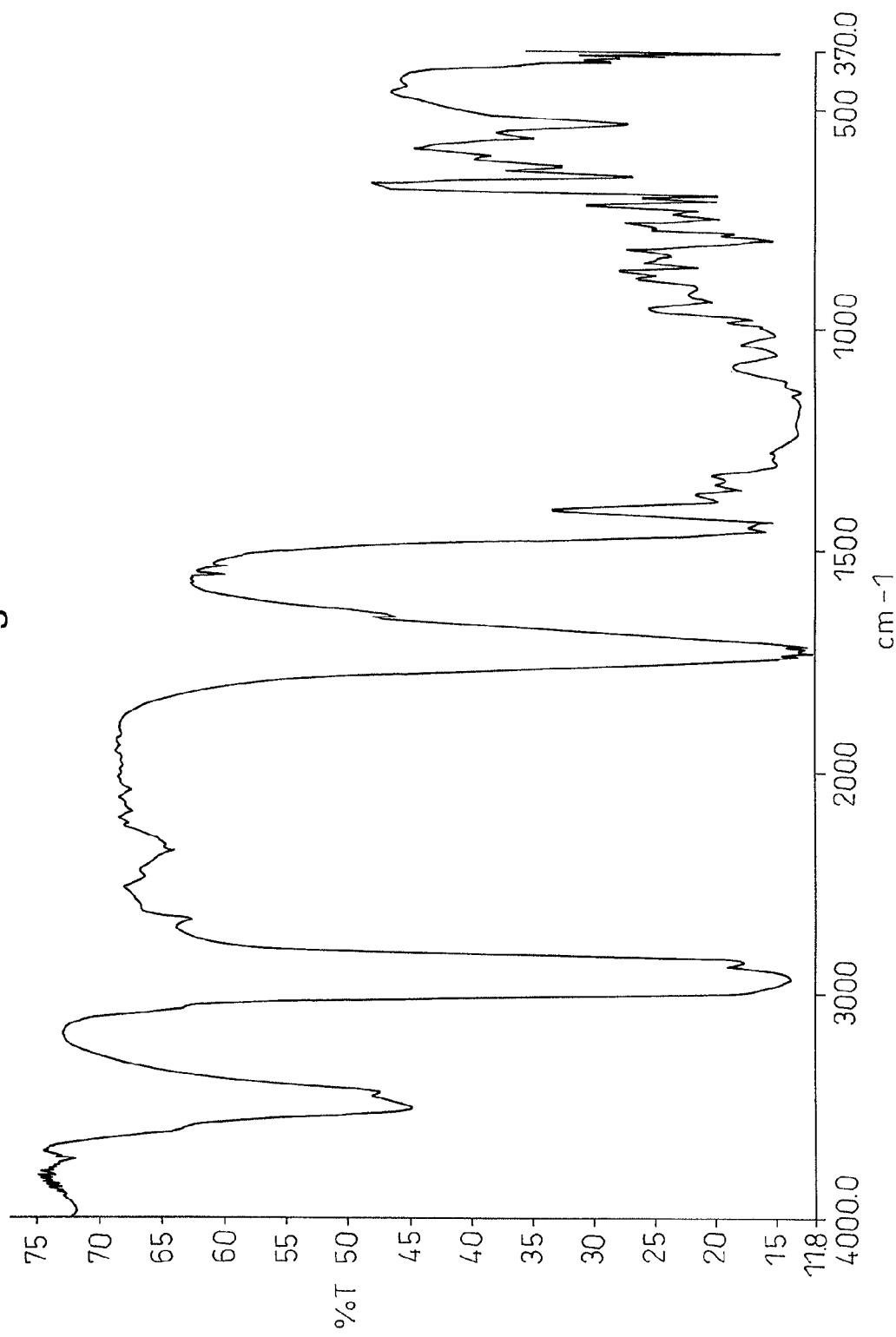
FIG. 24 A chart showing the IR spectrum of a distillate obtained in Working Example 6.

From the product obtained in Working Example 1, monomers and a small amount of low molecular weight oligomers were evaporated using a molecular distillation still, Special Model MS-FL manufactured by Taika Kogyo Co., Ltd., at a vacuum of 0.3 Pa and a column temperature of 70° C. The epoxy equivalent of this distillate was 355 g/eq., and GPC analysis indicated a number average molecular weight of 1352 and a weight average molecular weight of 2398. The $^1$H-NMR, $^{13}$C-NMR, $^{19}$F-NMR, and IR spectra of the distillate obtained are shown in FIGS. 21 to 24.

Working Example 7

Figure 25:
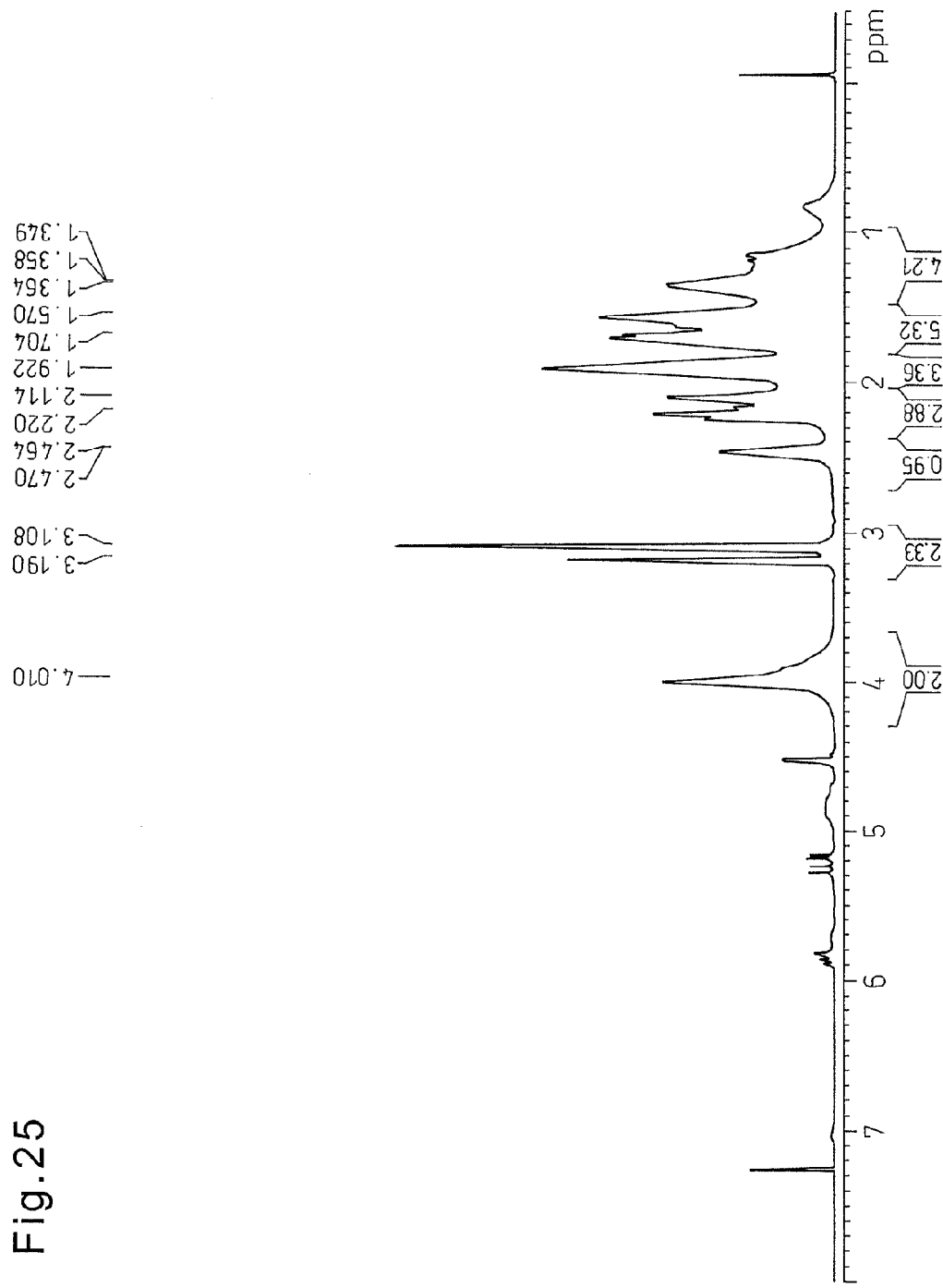
FIG. 25 A chart showing the $^1$H-NMR spectrum of a distillate obtained in Working Example 7.
Figure 26:
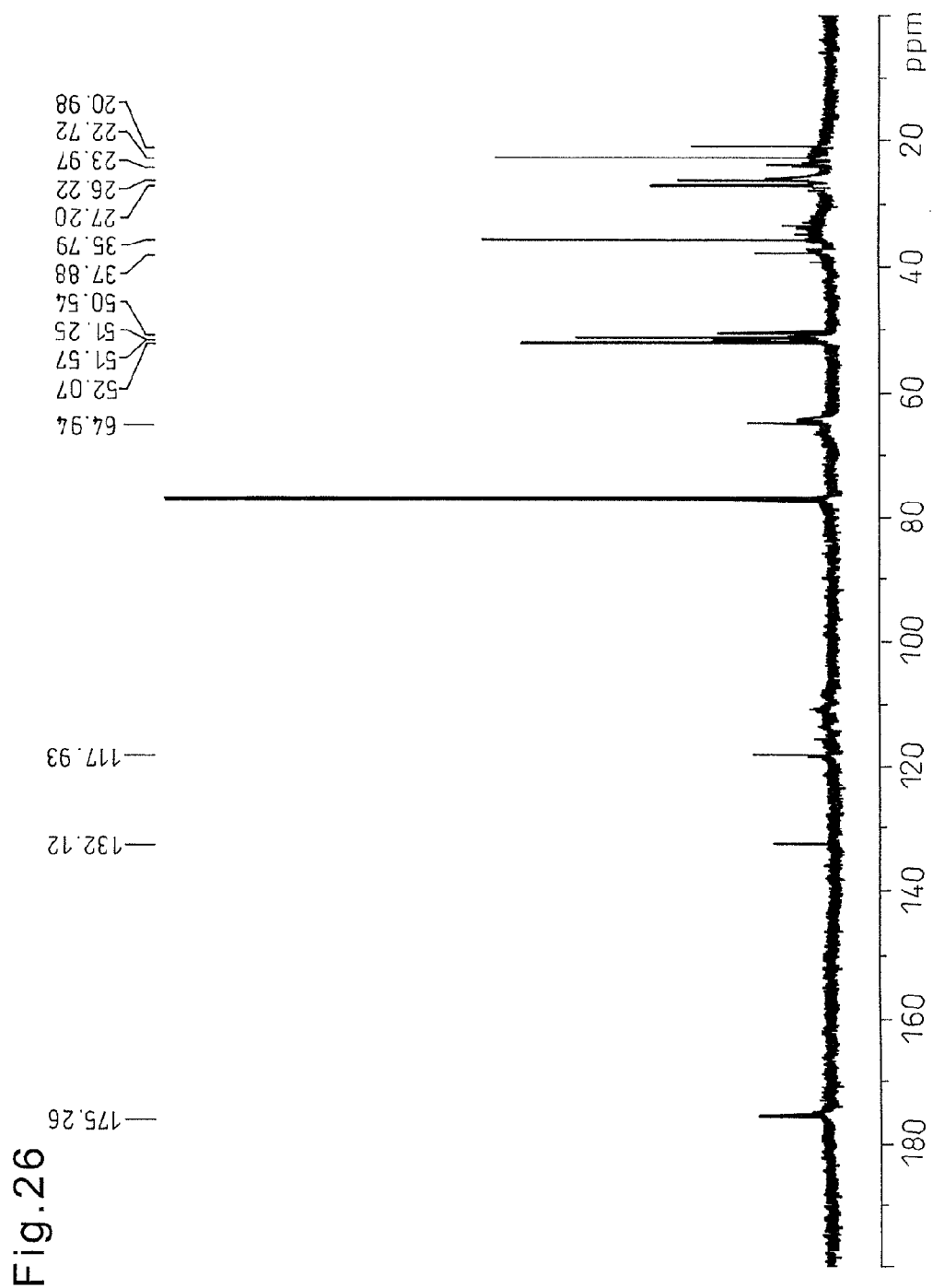
FIG. 26 A chart showing the $^{13}$C-NMR spectrum of a distillate obtained in Working Example 7.
Figure 27:
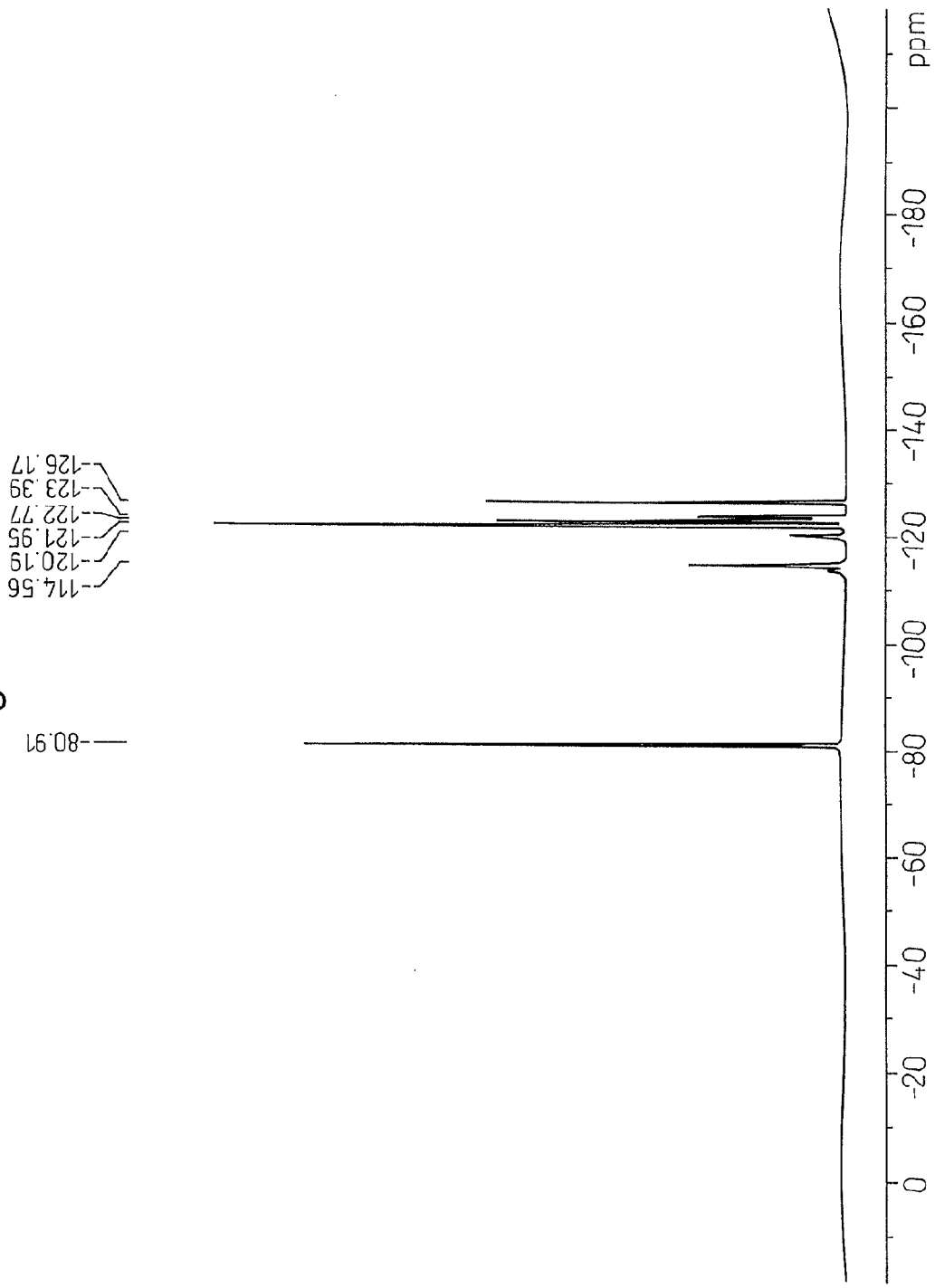
FIG. 27 A chart showing the $^{19}$F-NMR spectrum of a distillate obtained in Working Example 7.
Figure 28:
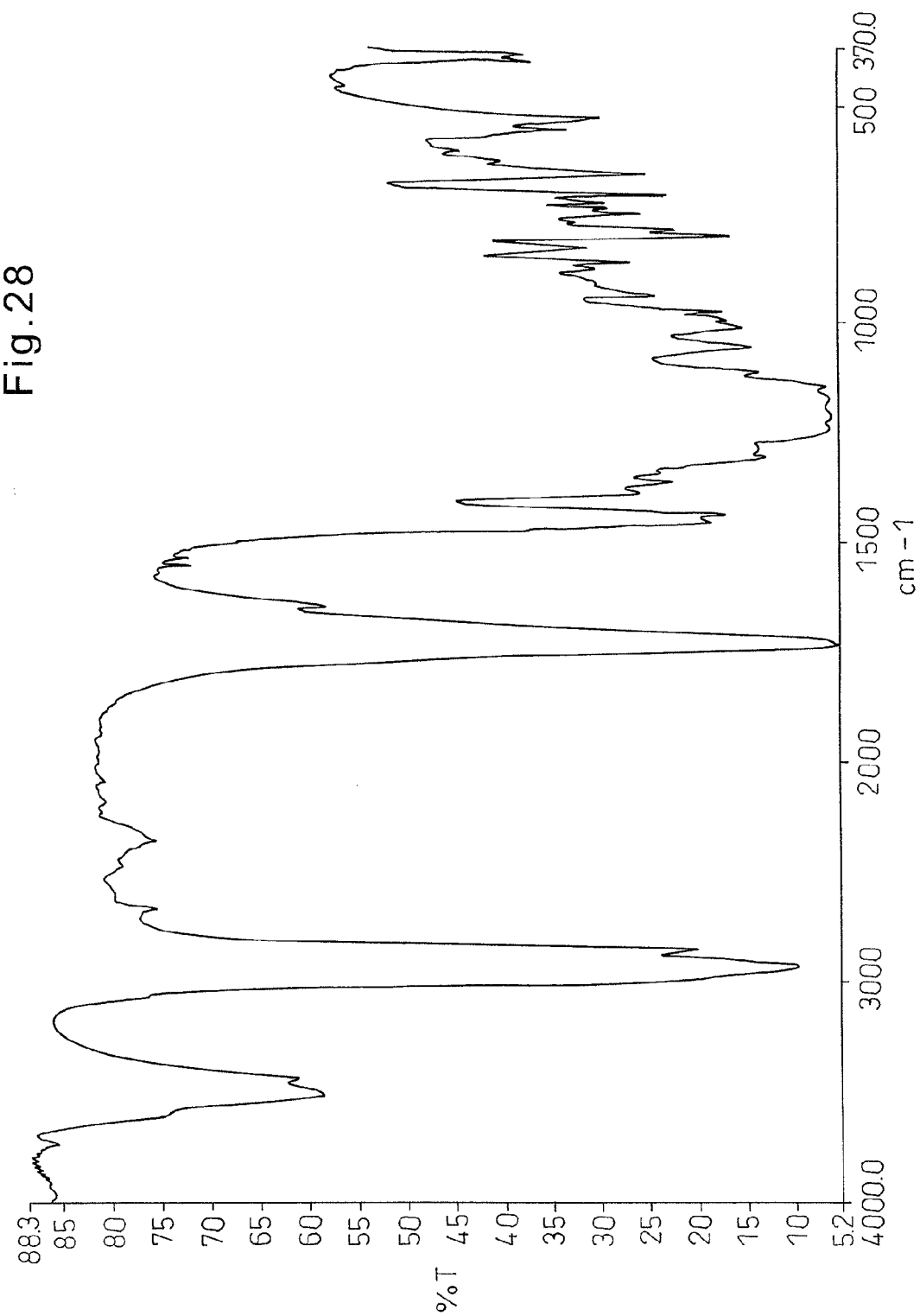
FIG. 28 A chart showing the IR spectrum of a distillate obtained in Working Example 7.

From the product obtained in Working Example 5, monomers and a small amount of low molecular weight oligomers were evaporated using a molecular distillation still, Special Model MS-FL manufactured by Taika Kogyo Co., Ltd., at a vacuum of 0.3 Pa and a column temperature of 70° C. The epoxy equivalent of this distillate was 368 g/eq., and GPC analysis indicated a number average molecular weight of 1486 and a weight average molecular weight of 1989. The $^1$H-NMR, $^{13}$C-NMR, $^{19}$F-NMR, and IR spectra of the distillate obtained are shown in FIGS. 25 to 28.

Comparative Example 1

To a personal organic synthesis instrument PPV-4060 (a simple-type autoclave) manufactured by Tokyo Rikakikai Co., Ltd., 30.0 g (0.24 mmol) of 4-vinylcyclohexene oxide (hereinafter referred to as VCO, manufactured by Daicel Corp., Celloxide 2000), 21.1 g (61.0 mmol) of perfluorohexylethylene (CHEMINOX PFHE manufactured by Unimatec Co., Ltd.), 2.25 g of di-t-butyl peroxide (PERBUTYL-D manufactured by NOF Corp., purity: 98%, 15.1 mmol), and 30.0 g of cyclohexane were fed, and after purging with nitrogen, the reaction vessel was sealed and reacted at 160° C. for 4 hours. Calculation of the ratio of each component contained in the copolymer from the conversion rate of the feed revealed that the polymerized units of 4-vinylcyclohexene oxide were 52 mole % and the polymerized units of PFHE were 48 mole %. After the reaction was completed, unreacted perfluorohexylethylene and cyclohexane were evaporated by an evaporator. The epoxy equivalent of the evaporated liquid obtained was 938 g/eq., and GPC analysis indicated a number average molecular weight of 1237 and a weight average molecular weight of 1403.

The reaction results and the material values of the reaction mixtures obtained in Working Example 1, Working Example 5, and Comparative Example 1 are summarized in following Table 1.

TABLE 1

| | | Conv. rate [%] | | Epoxy equivalent | Number average molecular weight |
|---|---|---|---|---|---|
| | Feed 1 | Feed 2 | Feed 1 | Feed 2 | | |
| Work. Ex. 1 | CEA | PFHE | 86.4 | 97.4 | 328 | 731 |
| Work. Ex. 5 | CEA | PFOE | 73.4 | 100.0 | 327 | 1270 |
| Comp. Ex. 1 | VCO | PFHE | 18.1 | 76.6 | 938 | 1237 |

It can be understood that since the conversion rates of the feed 1 in Working Examples 1 and 5 are markedly high as compared to that in Comparative Example 1, and the epoxy equivalents in these examples are sufficiently small, the copolymerization reaction of interest efficiently proceeded without the progress of side reactions, such as the opening of the epoxy ring. In addition, the number average molecular weights are not excessively high, which exhibits excellent workability.

[Preparation of Cured Product]

Working Example 8

Preparation of CEA-PFHE Resin

Sixty nine parts by weight of the distillate obtained in Working Example 6, 30 parts by weight of methylhexahydro phthalic anhydride (HN-5500E manufactured by Hitachi Chemical Co., Ltd.) as a curing agent, and 1 part by weight of tetrasubstituted phosphonium bromide (U-CAT5003 manufactured by San-Apro Ltd.) as a curing promoter were mixed to homogeneity to prepare a curable composition. This curable composition was run onto a petri dish made of a TPX (methylpentene (manufactured by Mitsui Chemicals, Inc.)) resin to a thickness of 1 mm, and heated at a temperature profile of 60° C. for 2 hours, 100° C. for 2 hours, and 150° C. for 2 hours to obtain a pale yellow transparent cured plate.

Working Example 9

Preparation of CEA-PFOE Resin

Seventy parts by weight of the distillate obtained in Working Example 7, 29 parts by weight of methylhexahydro phthalic anhydride (HN-5500E manufactured by Hitachi Chemical Co., Ltd.) as a curing agent, and 1 part by weight of tetrasubstituted phosphonium bromide (U-CAT5003 manufactured by San-Apro Ltd.) as a curing promoter were mixed to homogeneity to prepare a curable composition. This curable composition was run onto a petri dish made of a TPX (methylpentene (manufactured by Mitsui Chemicals, Inc.)) resin to a thickness of 1 mm, and heated at a temperature profile of 60° C. for 2 hours, 100° C. for 2 hours, and 150° C. for 2 hours to obtain a pale yellow transparent cured plate.

Comparative Example 2

Preparation of Alicyclic Epoxy Resin

Forty six parts by weight of 3,4-epoxycyclohexenylmethyl-3',4'-epoxycyclohexene carboxylate (Celloxide 2021P manufactured by Daicel Corp.), 53 parts by weight of methylhexahydro phthalic anhydride (HN-5500E manufactured by Hitachi Chemical Co., Ltd.) as a curing agent, and 1 part by weight of tetrasubstituted phosphonium bromide (U-CAT5003 manufactured by San-Apro Ltd.) as a curing promoter were mixed to homogeneity to prepare a curable composition.

This curable composition was run into an aluminum plate sandwiching a silicone rubber string with a thickness of 1 mm, and heated at a temperature profile of 60° C. for 2 hours, 100° C. for 2 hours, and 150° C. for 2 hours to obtain a colorless transparent cured plate.

[Measurement of Moisture Permeability]

Using the cured plates with a thickness of 1 mm obtained in Working Examples 8 and 9 and Comparative Example 2, moisture permeability [g/m$^2$·24 hr] at 40° C. and 1 atm was determined using a gas permeability measuring instrument (GTR-30XASD manufactured by GTR Tec Corp.).

[Measurement of Contact Angle]

Using the cured plates with a thickness of 1 mm obtained in Working Examples 8 and 9 and Comparative Example 2, the contact angle of water was determined using a contact angle meter (DM-500 manufactured by Kyowa Interface Science Co., Ltd.).

The above characteristic values determined using the cured plates obtained in Working Examples 8 and 9 and Comparative Example 2 are summarized in following Table 2.

TABLE 2

| Resin | Moisture permeability [g/m² · 24 hr] | Contact angle [°] |
|---|---|---|
| Work. Ex. 8 | CEA-PFHE | 0.36 | 97.9 |
| Work. Ex. 9 | CEA-PFOE | 0.27 | 97.4 |
| Comp. Ex. 2 | Alicyclic epoxy resin | 2.06 | 77.0 |

Since the moisture permeabilities of the cured plates are low and the contact angles are significantly large in Working Examples 8 and 9, as compared to those in Comparative Example 2, it can be understood that these cured plates have high water repellency and excellent water vapor barrier property.

INDUSTRIAL APPLICABILITY

With the fluorine and epoxy group-containing copolymer of the present invention, a fluorine atom- and epoxy group-introduced curable resin having excellent water repellency and water vapor barrier property can be obtained. Therefore, the fluorine and epoxy group-containing copolymer of the present invention can be suitably used in the fields of surface coating materials and sealing agents for semiconductor devices and light emitting devices and the like.

The invention claimed is:

1. A fluorine and epoxy group-containing copolymer comprising a monomer unit represented by following general formula (1):

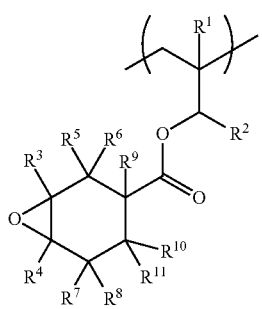
(1)

[wherein $R^1$-$R^{10}$ each independently represent a hydrogen atom or an alkyl group having 1-3 carbon atoms, $R^{11}$ represents a hydrogen atom, a methyl group, or a phenyl group, and $R^5$ or $R^6$ can be linked to $R^7$ or $R^8$ to form a ring], and a monomer unit represented by following general formula (2):

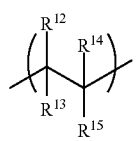
(2)

[wherein $R^{12}$ and $R^{13}$ each independently represent a hydrogen atom or a fluorine atom, $R^{14}$ represents a hydrogen atom, a fluorine atom, a methyl group or a trifluoromethyl group, and $R^{15}$ represents a fluorine atom or a perfluoroalkyl group having not greater than 12 carbon atoms].

2. The fluorine and epoxy group-containing copolymer according to claim 1 wherein the monomer unit represented by general formula (1) is at least one represented by the following formula:

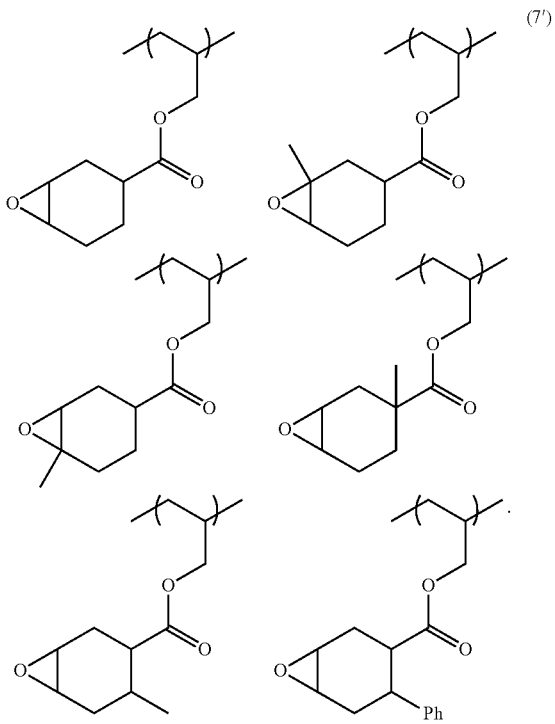
(7')

3. The fluorine and epoxy group-containing copolymer according to claim 2 wherein the monomer unit represented by general formula (1) is represented by the following formula:

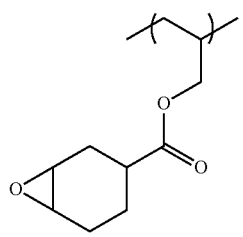

and, in the monomer unit represented by general formula (2), $R^{12}$, $R^{13}$, and $R^{14}$ are a hydrogen atom, and $R^{15}$ is a perfluorohexyl group or a perfluorooctyl group.

4. The fluorine and epoxy group-containing copolymer according to claim 1, further comprising a monomer unit represented by following general formula (3):

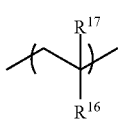
(3)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

5. The fluorine and epoxy group-containing copolymer according to claim 1 wherein the epoxy equivalent of the copolymer is 190 g/eq. to 3000 g/eq.

6. The fluorine and epoxy group-containing copolymer according to claim 1 wherein the number average molecular weight of the copolymer is 400-10000.

7. The fluorine and epoxy group-containing copolymer according to claim 2, further comprising a monomer unit represented by following general formula (3):

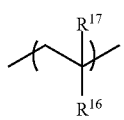
(3)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

8. The fluorine and epoxy group-containing copolymer according to claim 3, further comprising a monomer unit represented by following general formula (3):

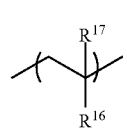
(3)

[wherein $R^{16}$ represents an alkyl group having not greater than 18 carbon atoms, a saturated or unsaturated alicyclic group having 3-20 carbon atoms, or an aralkyl group having 7-20 carbon atoms, and $R^{17}$ represents a hydrogen atom or a methyl group].

9. The fluorine and epoxy group-containing copolymer according to claim 2 wherein the epoxy equivalent of the copolymer is 190 g/eq. to 3000 g/eq.

10. The fluorine and epoxy group-containing copolymer according to claim 3 wherein the epoxy equivalent of the copolymer is 190 g/eq. to 3000 g/eq.

11. The fluorine and epoxy group-containing copolymer according to claim 2 wherein the number average molecular weight of the copolymer is 400-10000.

12. The fluorine and epoxy group-containing copolymer according to claim 3 wherein the number average molecular weight of the copolymer is 400-10000.

* * * * *